US006773173B2

(12) United States Patent
Wang

(10) Patent No.: US 6,773,173 B2
(45) Date of Patent: Aug. 10, 2004

(54) PHOTOGRAPHIC FILM CARTRIDGE AND CAMERA INCLUDING SUCH

(75) Inventor: Ching Miao Wilson Wang, MP Industrial Center (HK)

(73) Assignee: Ginfax Development Ltd., Chai Wan (HK)

( * ) Notice: Subject to any disclaimer, the term of this patent is extended or adjusted under 35 U.S.C. 154(b) by 49 days.

(21) Appl. No.: 10/124,718

(22) Filed: Apr. 17, 2002

(65) Prior Publication Data

US 2003/0086709 A1 May 8, 2003

Related U.S. Application Data

(63) Continuation-in-part of application No. 10/083,331, filed on Feb. 25, 2002.

(30) Foreign Application Priority Data

Nov. 2, 2001 (NZ) ................................................ 515259

(51) Int. Cl.[7] ............................................... G03B 17/02
(52) U.S. Cl. ......................... 396/513; 396/515; 396/538
(58) Field of Search ................................ 396/511, 512, 396/513, 515, 538

(56) References Cited

U.S. PATENT DOCUMENTS

| 968,716 | A | * | 8/1910 | Vale ............................ 396/513 |
| 3,918,075 | A | | 11/1975 | Horn et al. |
| 4,769,556 | A | | 9/1988 | Meisner |
| 4,841,319 | A | | 6/1989 | Hansen |
| 5,799,222 | A | | 8/1998 | Ishihara |
| 6,240,259 | B1 | * | 5/2001 | Gable .......................... 396/322 |
| 6,249,646 | B1 | | 6/2001 | Chen |
| 6,402,396 | B2 | * | 6/2002 | Hori ............................ 396/511 |
| 6,447,176 | B2 | * | 9/2002 | White et al. ................. 396/513 |
| 6,450,709 | B1 | * | 9/2002 | Tatamiya ..................... 396/513 |
| 6,522,835 | B2 | * | 2/2003 | So et al. ......................... 396/6 |
| 2001/0024572 | A1 | * | 9/2001 | Katano ........................ 396/411 |

FOREIGN PATENT DOCUMENTS

EP     1120681     8/2001

OTHER PUBLICATIONS

WO98/11469 (Concord Camera Corp.) Mar. 19, 1998.

* cited by examiner

Primary Examiner—David M Gray
(74) Attorney, Agent, or Firm—Kaplan & Gilman, LLP

(57) ABSTRACT

A camera comprises a camera body with a lens and shutter operating control and film cartridge removable from the camera body having an unexposed film spool region and an exposed film spool region and a bridging portion between those regions. An opening in the cartridge permits light from the lens to pass through the opening to the film at the bridging portion. A door closes the opening of the cartridge and the door is openable with the cartridge installed in or attached to the camera body. Cooperating elements on the camera body and the cartridge open the door or close the door with the door being openable when the cartridge is fully engaged with the camera body. There is a detented connection of the film cartridge in the camera body.

26 Claims, 29 Drawing Sheets

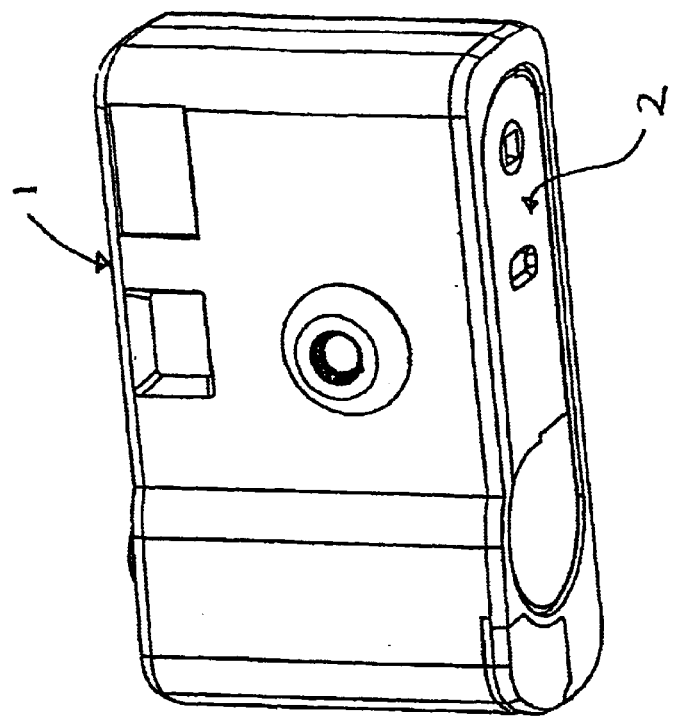
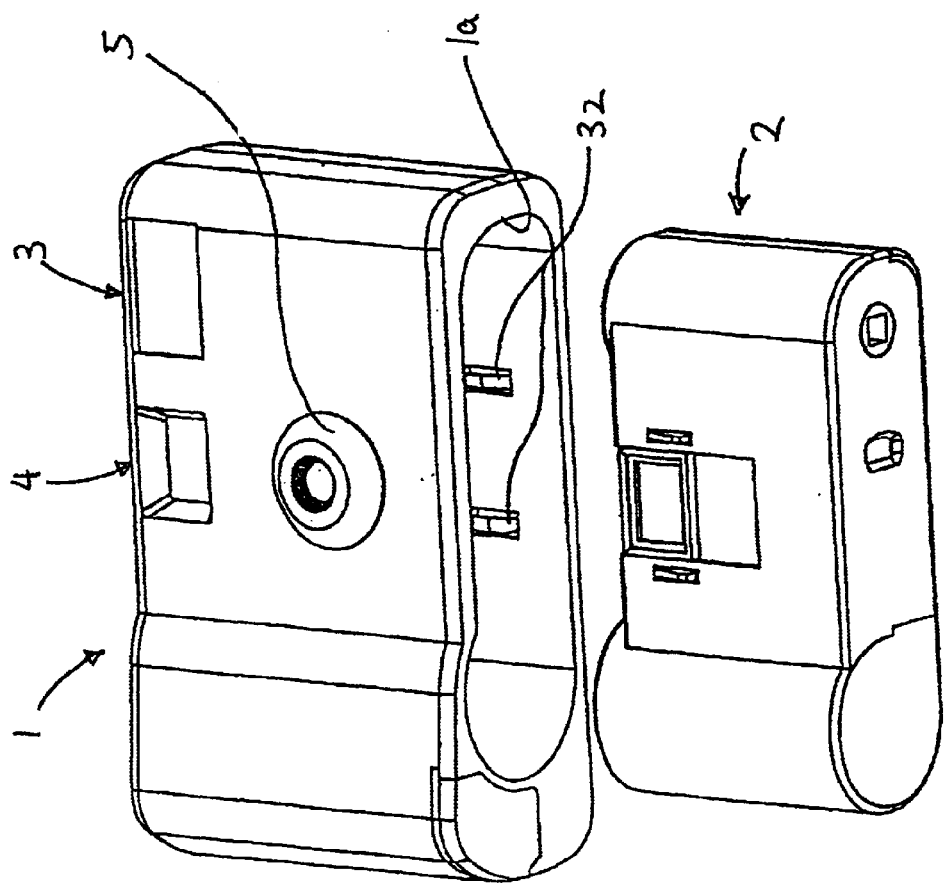

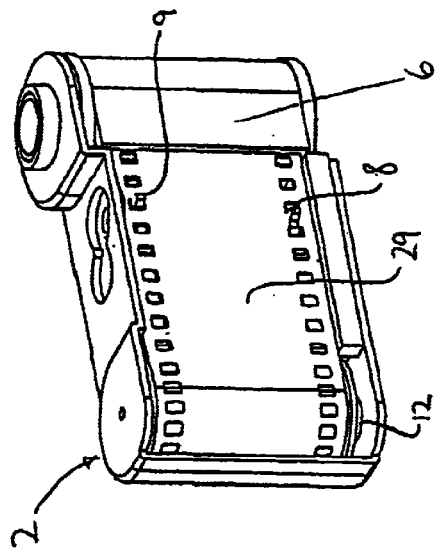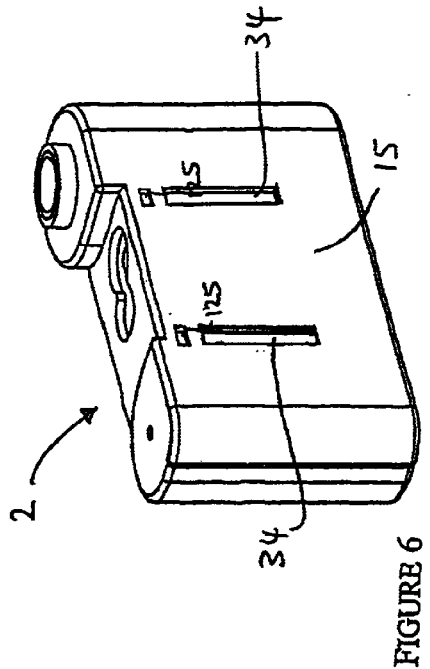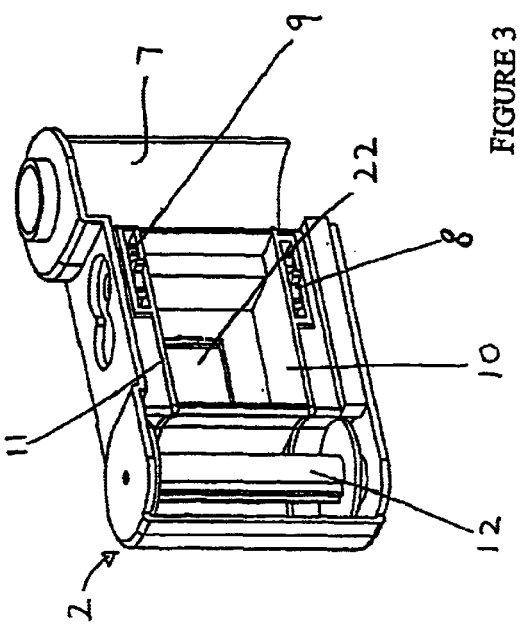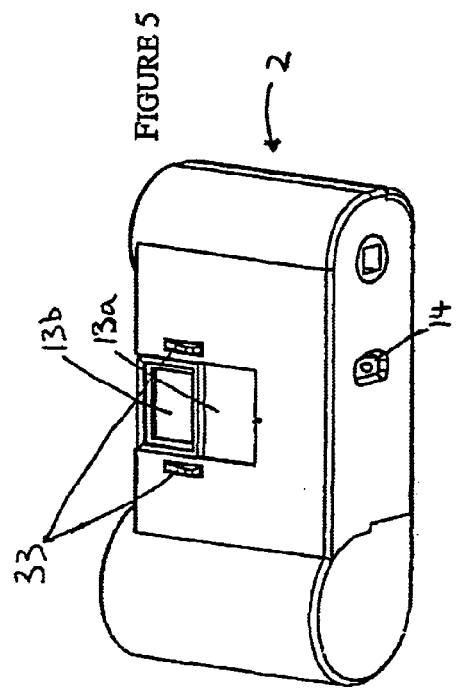
FIGURE 3
FIGURE 4
FIGURE 5
FIGURE 6

FIGURE 14(a)
FIGURE 14(b)
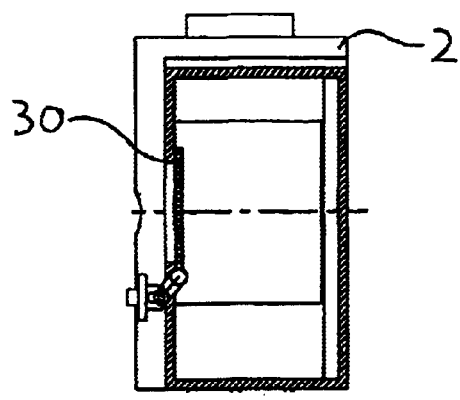
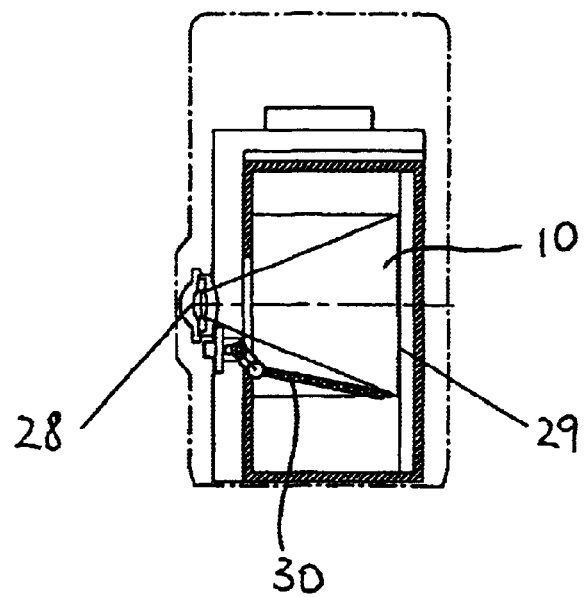

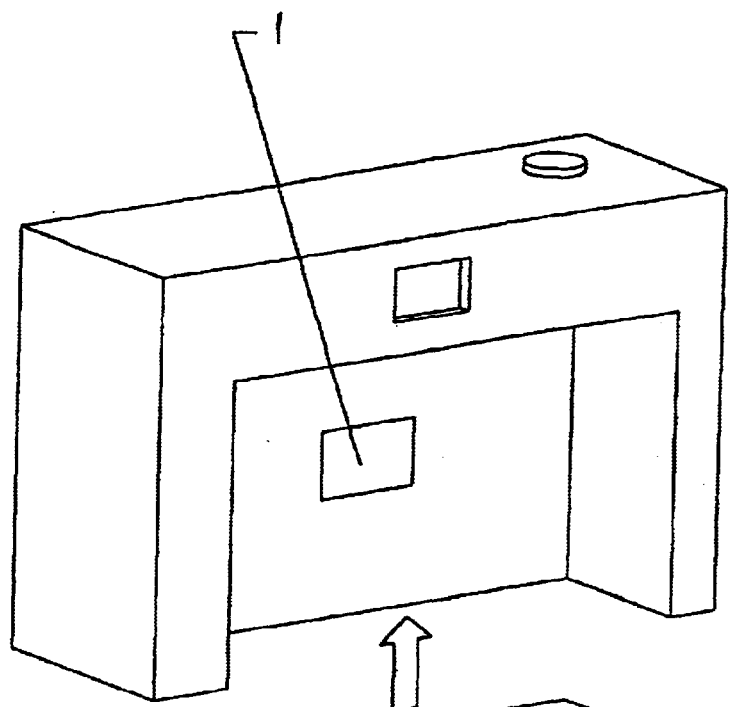
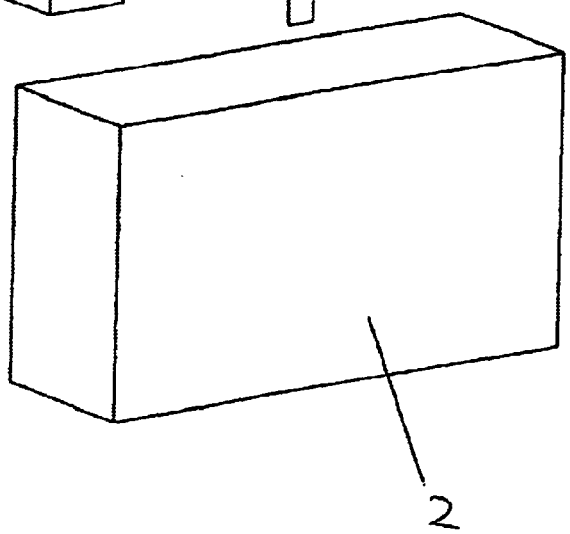
FIGURE 15

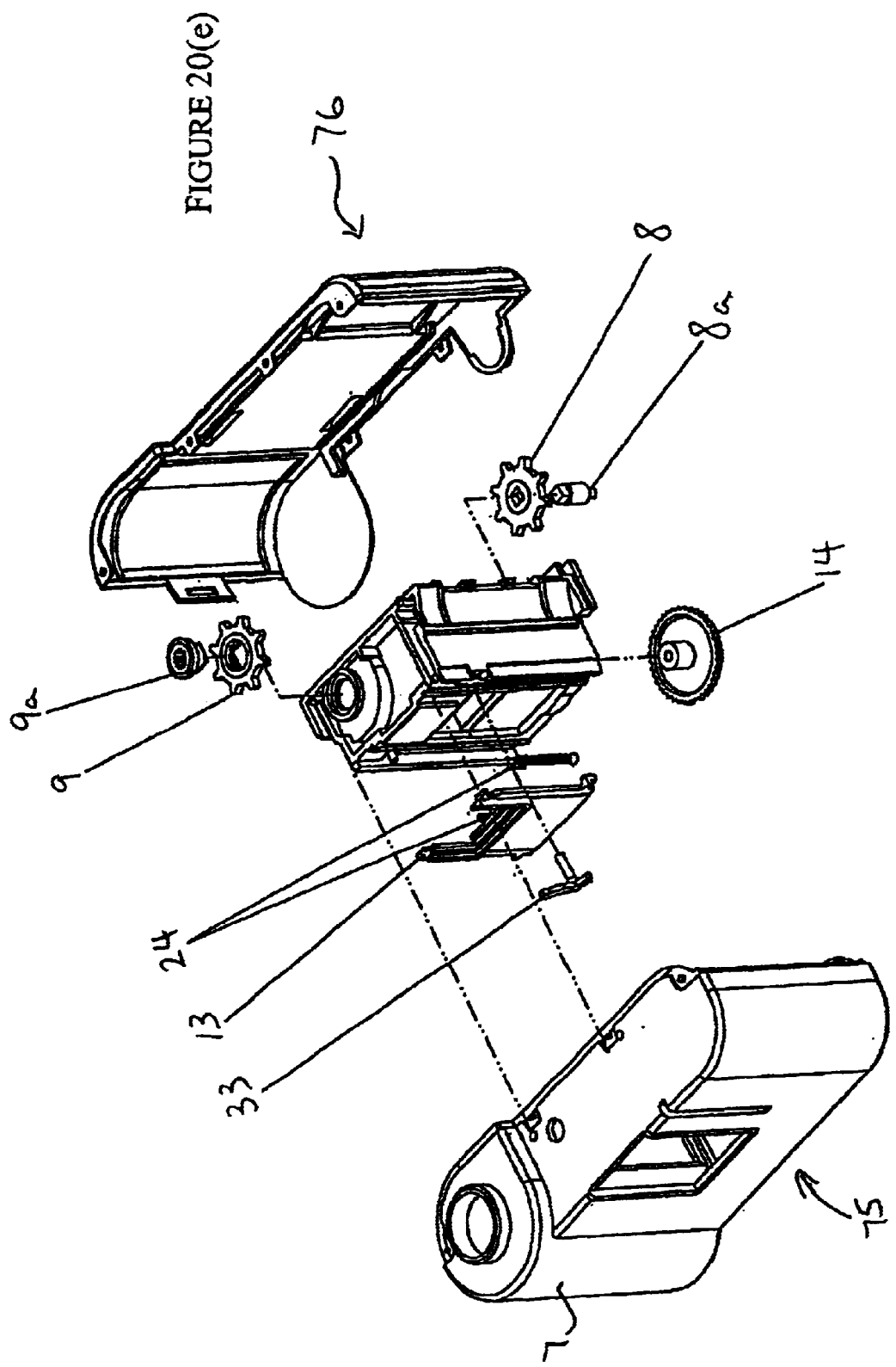

PHOTOGRAPHIC FILM CARTRIDGE AND CAMERA INCLUDING SUCH

RELATED PATENT APPLICATION

This application is a continuation-in-part of U.S. patent application Ser. No. 10/083,331, filed on Feb. 25, 2002, and New Zealand Patent Application No. 515259, filed on Nov. 2, 2001.

FIELD OF INVENTION

The present invention relates to a photographic film cartridge and camera including the cartridge and in particular although not solely of a kind to provide a semi disposable use.

BACKGROUND OF THE INVENTION

Nowadays, commonly used photographic films include 135 films, 120 films, 110 films and APS films, among which 135 films are the most popular films. 120 films are mainly used for commercial purposes because of their high quality and larger sizes. The size of 110 films is relatively small and its quality is relatively low, so it is not very popular. APS is a new technology and has a lot of advanced features, however, its film development system is not compatible with 135's, so the growth of APS has been restricted.

The development of disposable cameras has been comparatively fast.

There are many advantages in that they are easy to operate, low in cost, easy to carry and the quality is acceptable. Disposable cameras are particularly suitable for beginners. Since the procedures of inserting and removing the film involves some degree of knowledge and skill, the current disposable camera avoids the possibility of errors as far as loading of films is concerned because the film is pre-loaded.

There are two main disadvantages of disposable cameras. The cost of buying the camera includes both the camera set and the film set, but the camera set is disposed of after a single use although some of them may be recycled. This creates waste. Secondly, being a disposable item in nature, there is tight control on the production cost which therefore restricts the inclusion of more advanced features such as auto flash, auto wind and higher quality lens.

People have been trying to develop a product which can produce good quality photos like an ordinary 135 film camera but at the price of and with simplicity of operations of a disposable camera.

A combination camera body with features such as the lens, shutter, dark room and film winder which was capable of receiving a replaceable film cartridge has been available to the public before. The cartridge for use with the camera body came in the form of two film spooling regions, a first spooling region where the film was spooled in an unused state and a second spooling region to which the film was advanced after having been exposed. The two spooling regions were interconnected by a bridging portion wherein the bridging portion held the film in a position relative to the lens and shutter to allow exposure of each frame of the film. The spooling regions were effectively light sealed regions such that any film within the spooling regions could not be exposed to light. The film extending across the bridging region was able to be exposed to light and, when in use, such light was controlled by the lens and shutter arrangement of the camera body. The cartridge, outside of the camera body, did not provide any dark room effect to the film between the two spooling regions. Hence the use of cameras of this type required the film to be inserted into the camera body and remain within the body during the stages where the film was advanced from one spooling region to another, if no undesirable exposure of the film was to occur as a result of the cartridge being removed from the camera body and thereby allowing any films extending across the bridging region to be exposed. Such earlier designs hence did not lend themselves to allowing for film cartridges to be removed midway during use of the film without risking detrimental exposure of the film extending between the two spooling regions. Earlier type of design also required separate apparatus for processing the film in terms of handling the film from the cartridge after it had been used. Since the predominant format of film now is the 35 mm format and indeed the earlier film types in the cartridges such as the 110 format are now very uncommon, most development labs are set up for developing the 35 mm format or the APS format. Any introduction of a new format may mean that further handling equipment will need to be purchased by development labs to which there will be resistance. It would hence be desirable for a film cartridge to exist which includes a standard 35 mm film incorporated with a film canister which will make the subsequent handling of the film for development by development labs convenient.

It is accordingly an object of the invention to provide a photographic film cartridge which may be used with a camera body which provides greater flexibility and convenience of use or which will at least provide the public with a useful choice.

It is a further object to provide a camera body and film cartridge combination set which provides greater flexibility and convenience of use or which will at least provide the public with a useful choice.

It is a further object to provide a camera with a film cartridge removable and exchangeable without undesirable exposing of the film therein.

It is a further object of the present invention to provide a film cartridge which includes a preloaded film engaged for scrolling to and/or from a standard 35 mm or APS film canister.

SUMMARY OF THE INVENTION

Accordingly, a first aspect of the camera according to the present invention broadly comprises a photographic film cartridge forming a dark room for accommodating a film, and a camera body having a receptacle for removably and snugly accepting the cartridge therein. The cartridge is provided with an opening which remains closed when the cartridge is removed from the receptacle, and is openable for exposing the film to a light control device to form an image on the film when the cartridge is accepted in the receptacle.

A door is provided to be selectively movable between a first position to close the opening and a second position to open the opening. Preferably the door is forced to remain at the first position by a spring and kept there by a locking latch when the cartridge is outside the camera body. Preferably the locking latch is unlocked and the door is moved to the second position upon insertion of the cartridge into the receptacle.

Thus, the cartridge can be removed from the camera body anytime without exposing the film therein. This is very helpful when a user wants to change different types of film to suit different uses (e.g. different ASA) or the grouping of photos of a particular nature in a particular roll of film/film set (e.g. different occasions, different groups of people, different subject matters etc). Interchangeability of camera bodies for one film cartridge can also be achieved with the present invention. A camera body which provides particular features such as a wide angled lens, a colored lens or other effect type lens may be provided, where the film cartridge of the present invention is interchangeable between such bodies.

A second aspect of the present invention broadly comprises a film cartridge containing a film for engagement with a camera body to thereby in combination allow the capturing of an image onto the film in reliance on appropriately provided and positioned light control and projection means of said camera body to selectively allow light to be projected onto a portion of the film in said cartridge to thereby be exposed by said light. The film cartridge comprises: an unexposed film spool region, a second spool region, and a bridging portion between the unexposed film spool region and the second spool region via which the film can be advanced to at least in part be moved from the unexposed film spool region to the second region. The bridging region provides a dark room for the film between the unexposed film spool region and the second spool region. The bridging region includes an opening positioned such that when the film cartridge is engaged with the camera body, film is presented for exposure by light admitted through the light control means of the camera body and the opening of the film cartridge.

A door is provided to the film cartridge to selectively move between a first and second position In the first position, the cartridge opening is closed to prevent light from entering the dark room. In the second condition, the opening is open to allow exposure of the film.

A third aspect of the present invention broadly comprises a camera having a camera body and a film cartridge containing a film, in engagement with the camera body to thereby in combination allow the capture of an image onto the film in reliance on appropriately provided and positioned light control and projection means of the camera body to selectively allow light to be projected onto a portion of the film in the cartridge to thereby be exposed to light.

The film cartridge comprises: an unexposed film spool region, a second spool region and a bridging portion between the unexposed film spool region and the second spool region via which the film can be advanced to at least in part be moved from the unexposed film spool region to the second region.

The bridging region provides a dark room for the film between the unexposed film spool region and the second spool region. The bridging region includes an opening positioned such that when the film cartridge is engaged with the camera body, film is presented for exposure to light admitted through the light control means of the camera body and the opening of the film cartridge.

A door is provided to the film cartridge to selectively move between a first and second position. In the first position, the opening is closed to prevent light from entering the dark room and in the second condition, the opening is open to allow exposure of the film. The door is preferably maintained in the first position until the cartridge is fully engaged in the camera body.

Preferably, when in a fully engaged condition, the camera body and the cartridge cooperate to define a region which is fight sealed except when the light control means is activated to expose part of the film in the bridging portion.

The door is preferably actuated to move between the first and second positions by an actuation means of the camera body.

Preferably a safety latch is provided to prevent the door from being accidentally opened when the cartridge is not in the camera body.

A spring is preferably used to move the door from the first position to the second position. The door is preferably pivotably engaged to said bridging region or is translatably engaged to said bridging region.

The actuation means preferably engages a safety latch for the door to trigger the movement of the door from the second position to the first position. A spring is preferably used to move the door from the second position to the first position. The actuation means preferably becomes operable to move the door upon the action of insertion and removal of the cartridge with the camera body.

The actuation means is preferably operable by the action of the user once the cartridge is fully engaged with the camera body. The actuation means is preferably operable upon depression of the camera body shutter control button.

Film provided inside the cartridge is engaged to a film canister, preferably of a standard 35 mm format. The film canister is preferably located at the unexposed film spool region of the cartridge such that during advancement of the film for exposure, the film is at least in part transferred from the canister to the second spool region. The film canister may preferably be located at the second spool region of the cartridge such that during advancement of the film for exposure, the film is transferred from the second spool region to the canister. The film cartridge is preferably provided for use in a condition wherein the unexposed film is in a substantial part spooled in the unexposed spool region and wherein the film extends to a distal end thereof engaged to the film canister located in the second spool region.

A further aspect of the present invention comprises a camera body for use in combination with a film cartridge as hereinbefore described A further aspect comprises a camera body and at least one film cartridge as hereinbefore described provided in a marketable pack suitable for retail.

Yet another aspect of the present invention broadly consists in a camera or a film cartridge for use to define a camera having a control unit with which the cartridge can, in engagement with the control unit in combination, allow capture of an image onto the film in reliance on appropriately provided and positioned shutter and projection means of the cartridge, to selectively allow light to be projected onto a portion of the film in the cartridge to thereby be exposed by the light, wherein the control unit provides at least one of a trigger for activating the movement of the shutter, a flash, a film winder, a view finder, a film counter.

The film cartridge comprises: an unexposed film spool region, a second spool region and a bridging portion between the unexposed film spool region and the second spool region via which film can be advanced to at least in part be moved from the unexposed film spool region to the second region.

The bridging region provides a dark room for the film between the unexposed film spool region and the second spool region. The bridging region includes a light aperture and shutter and projection means (e.g. a lens) positioned such that when the film cartridge is engaged with the control unit, film is presented for exposure by light selectively admitted through the aperture.

A further aspect of the present invention comprises a film cartridge containing a film of an elongate kind having a first distal end and a second distal end engaged to a spooling spindle within a film canister, the cartridge being engageable with a camera body to thereby in combination allow the capturing of images onto the film in reliance on appropriately provided and positioned light control and projection means of the camera body, which selectively allow light to be projected onto a portion of the film in said cartridge. The film cartridge comprises: an unexposed film spool region, a second spool region within which the film canister is retained and a bridging portion between the unexposed film spool region and the second spool region via which the film can be advanced to at least in part be moved from the unexposed film spool region to the second region.

The bridging region provides a dark room for the film extending between the unexposed film spool region and the second spool region, when the film cartridge is engaged to the camera body. The bridging region includes an opening positioned such that when the film cartridge is engaged with the camera body, that portion of the film in the dark room is presented for exposure to light admitted through the light control means of the camera body and the opening of the film cartridge.

The film cartridge prevents light from entering the unexposed spool. The film cartridge is preferably a housing within which the film is located and sealed from exposure to light save for that portion of the film in the dark room.

The bridging region is preferably an enclosure which includes the opening The enclosure is preferably also open to the second spool region. The unexposed spool region is preferably enclosed except for a narrow slot through which the film can pass, such that the film in the unexposed film spool region is substantially sealed against light. The second spool region preferably includes means for driving the spooling spindle externally of the film cartridge.

The cartridge may be of one piece. But in an alternate embodiment, it is separable into one part with one of the spool regions and another part with the rest of the cartridge. The parts are detachably latchable together. This facilitates removal of film from the one part and also permits easy installation of a new film supply into the one part, which may then be transferred back to the other spool region. From the other spool region, the film can be returned to the first spool region, this time exposing the film to the images in succession.

The housing of the camera body is preferably a two part housing having a front and rear part separably engaged to each other. The rear part is preferably a lid separably engaged to the front part.

The housing detents the cartridge in the camera body. As the camera body has a receptacle with an opening into it, the photographic film cartridge is installed in the receptacle. It is guided into position by a cooperating protrusion into groove connectors.

Once the cartridge is fully installed, detent tabs on the camera body snap into recesses in the rear of the cartridge and retain the cartridge. To release the cartridge a release device moves the tabs off the cartridge. It may comprise a lever or bar which is shifted to raise the tabs. A switch operates the lever or bar to release the cartridge.

This invention may also be said broadly to consist of the parts, elements and features referred to or indicated in this specification, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIG. 1 shows a camera body and cartridge film prior to it being engaged with the body.

FIG. 2 is a perspective view of the film cartridge inserted in the camera body.

FIG. 3 is the film cartridge with the backing plate of the cartridge and the film removed.

FIG. 4 is the same drawing as FIG. 3 but with film added.

FIG. 5 is a perspective view of the front of the film cartridge showing the window and various operating features.

FIG. 6 shows the fully assembled film cartridge.

FIG. 14(a) and FIG. 14(b) show an embodiment where the door for opening the dark room is part of the film cartridge but actuated by an actuator means of the camera body.

FIG. 15 shows an embodiment where the film cartridge is slid up and into the camera body.

FIG. 20(e) is the exploded view of the cartridge as shown in FIGS. 20(a)–(d).

DETAILED DESCRIPTION OF THE PREFERRED EMBODIMENTS

Figure 6A:
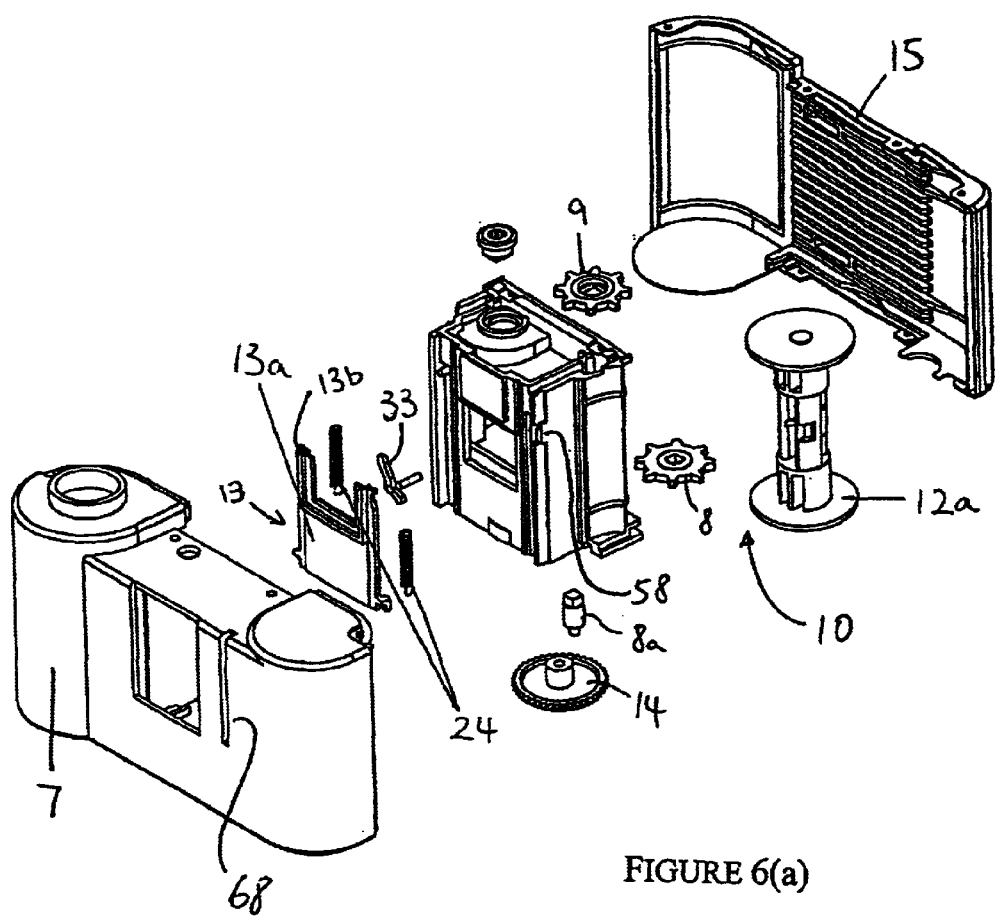
FIG. 6(a) is an exploded perspective view of an embodiment of the film cartridge.

FIG. 1 illustrates a camera body 1 and a film cartridge 2. The camera body 1 is provided with a receptacle 1a having a shape complementary with the contour of the cartridge 1, thus being able to snugly accept the cartridge 1 which in this view is inserted into the camera body 1 from below. On the front of the camera body there is a view finder 4, a camera flash 3 and a light control means, typically a camera lens 5. A pair of spring leaves or spring loaded arms 32 engages with corresponding grooves 34 (FIG. 5) formed in the back of the film cartridge 2 to locate the cartridge in position. A camera with flash function and auto winding function will also include electric circuits for the flash light and the motor, a battery slot and a gear system.

FIG. 2 shows the fully assembled camera comprising the camera body 1 and the film cartridge 2 which has been inserted from below and locked into position. Preferably, the bottom surface of the cartridge 2 is flush with that of the camera body 1 when the cartridge 2 is fully accepted in the receptacle 1a of the camera body 1.

FIGS. 3 and 6(a) show the disassembled film cartridge 2 with the back plate removed and the film removed. The film cartridge internals comprise a region 7 for exposed film and advancing sprockets 8 and 9 at the top and bottom respectively of the film cartridge to positively engage the film at its periphery. A film supporting structure 11 runs around the periphery of the dark room 10, which together with the backing plate 15 and a film cartridge door 13 provides a light proof chamber for the film inside the cartridge. A spool 12a contained within the body of the film cartridge 2 allows the winding on of a section of film into the dark room and subsequent exposure for an image to be captured.

FIG. 4 shows the film 29 that has been loaded into the film cartridge 2. The film, from the unexposed film spooling region 12, is passed through the dark room, is engaged with the advance sprockets 8 and 9 and is collected by the film collection spool 6. The film in the film cartridge is for example a standard 35 mm film scroll that is loaded in to the film cartridge by the factory. In this way the user does not have to consider handling, exposure and contamination issues of the film. The rolling structure of the camera body is attached to the sprockets 8 and 9 of the film cartridge and it rolls the film back to the used film spool region which for example includes the film canister. The canister is for example a standard container for 35 mm films and therefore allows the film to be processed normally by any camera shop after the film is removed from the film cartridge. The advancement of the film may however be the other way around where it is dispensed from the canister as opposed to collected therein.

The region of the cartridge where the film extends across the dark room requires control of the light such that when the cartridge is not engaged with the camera body, any film extending across the dark room is not undesirably exposed. However, at the same time, the dark room does require light to be accessible into the dark room when the cartridge is engaged with the camera body for taking a photograph. The dark room 10 has a light opening or film cartridge aperture 22 which allows for such light as controlled by the shutter of the camera body, to expose that portion of the film in the dark room. The film cartridge aperture however is preferably closed when the cartridge is not engaged with the camera body. This closure is preferably achieved by a film cartridge door 13. FIG. 5 shows the film cartridge door 13 which comprises two portions, the first portion 13a being light impermeable and the second portion 13b being U-shaped to form an opening through which light may permeate. The film cartridge door 13 is in a condition to prevent light from entering the dark room through the film cartridge aperture 22 at least during times when the cartridge is not fully engaged with the camera body.

Figure 7:
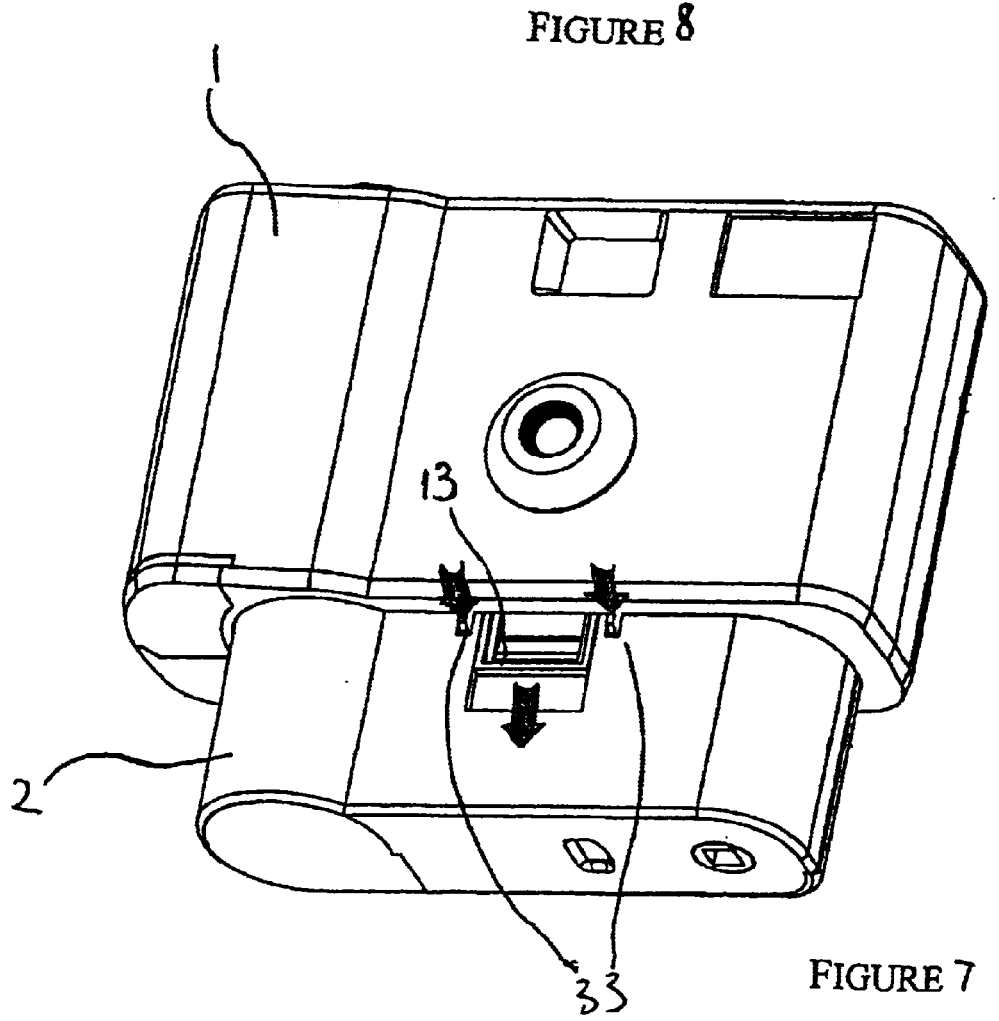
FIG. 7 shows the partial insertion of the film cartridge into the camera body and shows the operation of the film cartridge door.

FIG. 5 shows one embodiment of the film cartridge 2 wherein safety lock 33 prevent the movement of the film cartridge door 13 unless it is correctly engaged with the camera body. In this particular embodiment the insertion of the film cartridge 2 into the film body 1 activates the safety releases to allow the film cartridge door to be opened as illustrated in FIG. 7. The location of the film cartridge by insertion also then opens the film cartridge door 13, thereby placing the film cartridge in a state ready for exposure by the camera body shutter mechanism to expose the film on demand by the user and thus create an exposure on the film of the image captured.

FIG. 6 shows the fully assembled film cartridge 2 with the backing plate 15 attached whereby the film inside is safely guarded against any light penetrating and thus pre-exposing the film. The film cartridge is therefore ready for use by insertion into, or association with, the camera.

To direct the cartridge into a precise location in the camera body, the cartridge has an index or guide groove 68 seen in FIG. 6(a). As seen in FIG. 10(a), the camera body interior wall has an elongate web or protrusion 70 shaped to be received in the groove 68 only when the cartridge is properly aligned in the camera body, and the cooperating groove 68 and protrusion 70 are in continuous engagement to properly position the cartridge when installed. A camera operating component power supply, here electric battery 72, may also be in the cartridge and, through appropriate contacts in the cartridge and camera, powers the camera systems.

Figure 8:
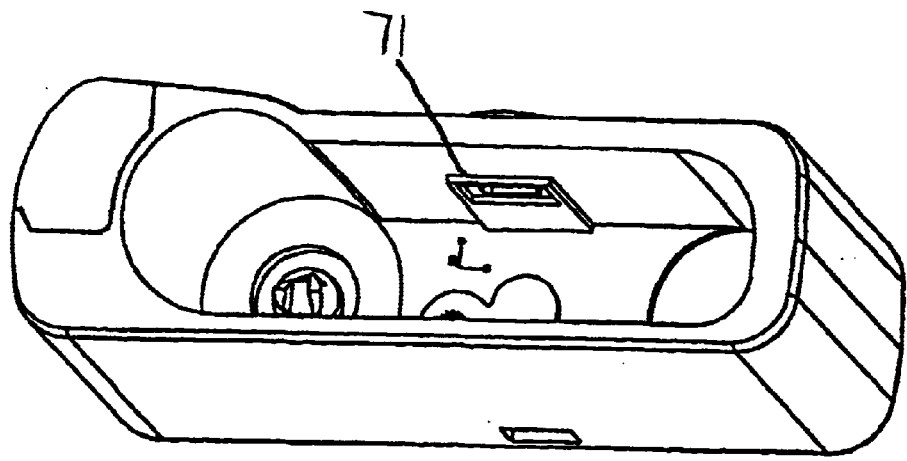
FIG. 8 shows the camera body from underneath showing the features that operate the film cartridge door.

In FIG. 7 the safety lock 33 is released when the film cartridge 2 is inserted into the camera body 1 by the front inside panel of the camera casing. Once these safety releases have been activated, the film cartridge door 13 is then free to slide out of the way when the cartridge is safely within the camera body, by the film cartridge door moving means or activator 71 shown in FIG. 8. In this way the film cartridge (and thus the film) can safely be removed and inserted at will by the user with there being no risk of undesired exposure of the film.

Figure 9B:
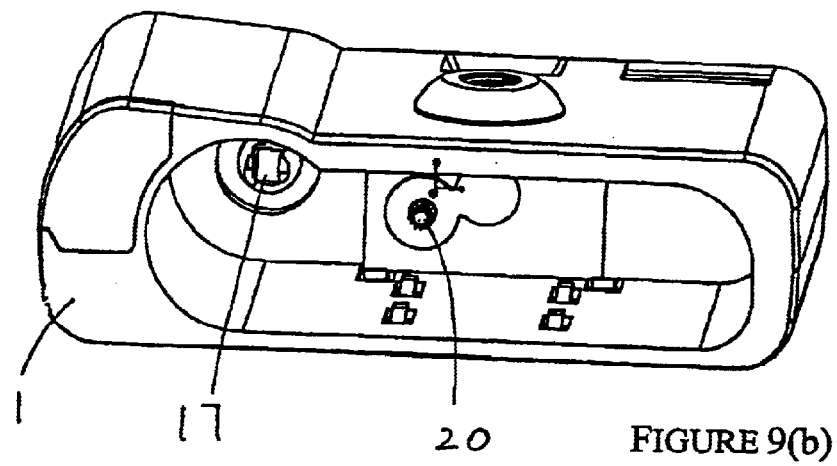
FIGS. 9(a) and 9(b) show the bottom and top of the camera and film cartridge respectively and illustrate some of the film advancement and control features.
Figure 9A:
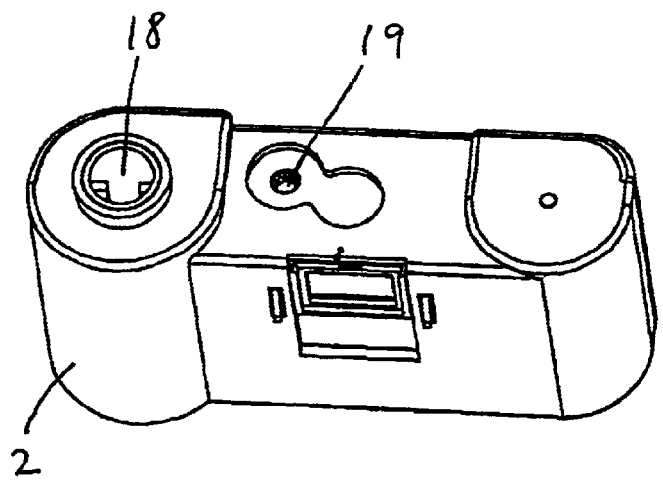

FIG. 9 shows the association of the controls within the camera body 1 in FIG. 9(b) to those mounted on top of the film cartridge 2 in FIG. 9(a). The film wind on control 17 of the camera body engages to a receiving means 18 on the collection spool 6 (FIG. 4) in the film cartridge 2. In this way, wind on of the film effected by the user on the camera body will be transmitted to the actual film in the film cartridge. The top film advance sprocket 9 has receiving means 9a associated with it to engage with an interlock control 20 in the camera body.

Figure 9C:
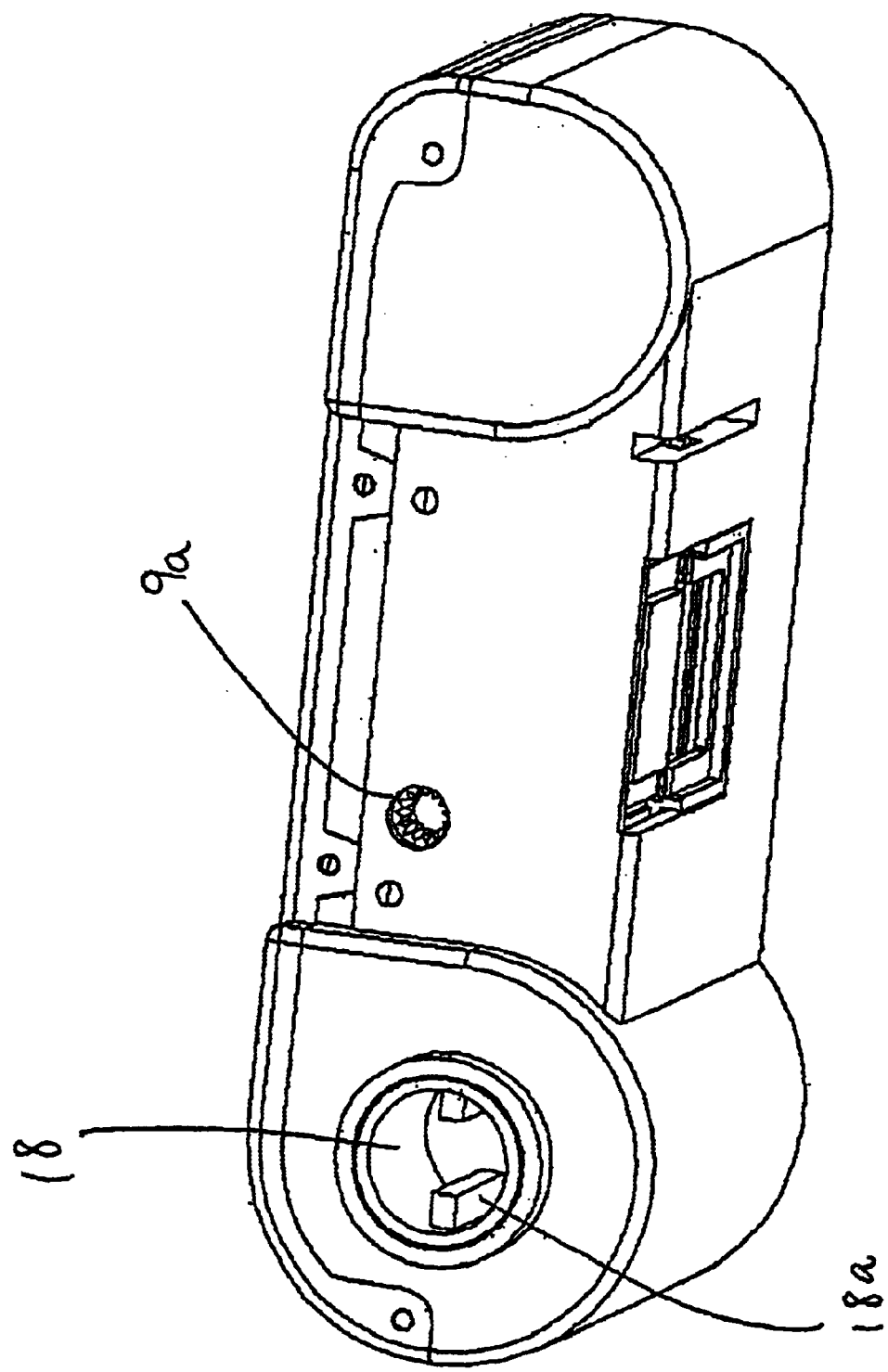
FIGS. 9(c)–9(f) is a top perspective views showing the interlock engagement between the counterpart elements of the cartridge and the camera body.
Figure 9D:
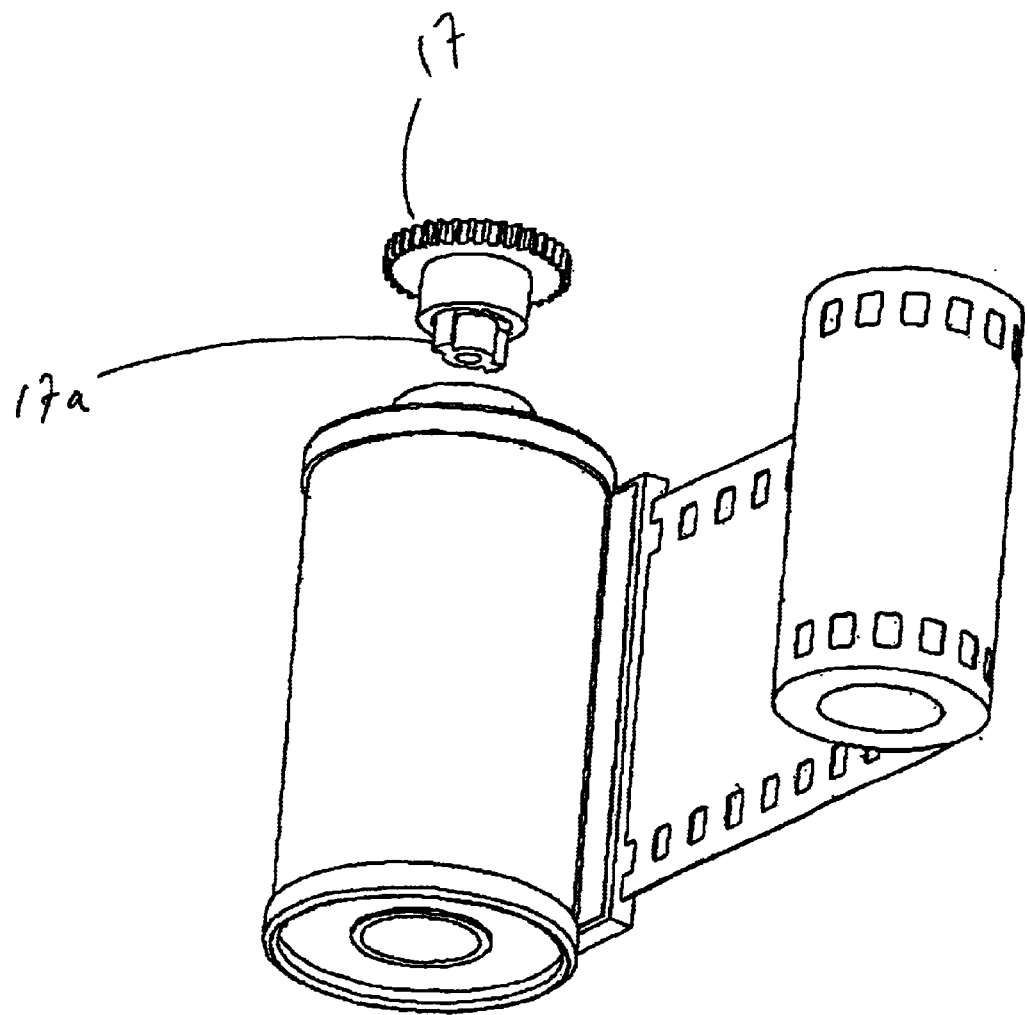

As illustrated in more detail in FIGS. 9c–9(d), the wind on control 17 is a toothed wheel with a shaft 17b having a pair of longitudinal protrusions 17a formed on the peripheral surface of the shaft 17b. The receiving means 18 formed on the collection spool 6 is a cylindrical receptacle for accepting the shaft 17b therein when the cartridge 2 is inserted in the camera body 1. A pair of abutment blocks 18a is provided inside the cylindrical receptacle 18 to engage with the protrusions 17a of the shaft 1b side by side, whereby the collection spool 6 follows the rotation of the toothed wheel 17.

When the cartridge 2 is inserted into the camera body 1, it can not be guaranteed that the protrusions 17a of the shaft 17b happen to abut on the top of the blocks 18a in the receptacle 18, and if so, the cartridge 2 can not be fully accepted in the camera body 1 and the wind on control 17 can not engage with the collection spool 6 properly. To solve this problem, the shaft 17b is not directly connected with the toothed wheel 17. Instead, the shaft 17b is accommodated in a sleeve 17c which is integrated with the toothed wheel 17. A spring (not shown) is provided inside the sleeve 17c to bias the shaft 17b outward of the sleeve 17c, or downward as shown in the figures. When inserting the cartridge 2 into the camera body 1, if the protrusions 17a of the shaft 17b happen to abut on the top of the blocks 18a, the blocks 18a will push the shaft 17b to retreat into the sleeve 17c against the biasing spring therein, whereby the abutment of the protrusions 17a on the top of the blocks 18 will not interfere the fully insertion of the cartridge 2 into the camera body 1. After the cartridge 2 is fully accepted inside the camera body 1, rotation of the toothed wheel 17 will bring the protrusions 17a to a position offset with the blocks 18, whereby the shaft 17b will be pushed into the receptacle 18 by the biasing spring in the sleeve 17c, and the protrusions 17a abut against the blocks 18 side by side.

Figure 9E:
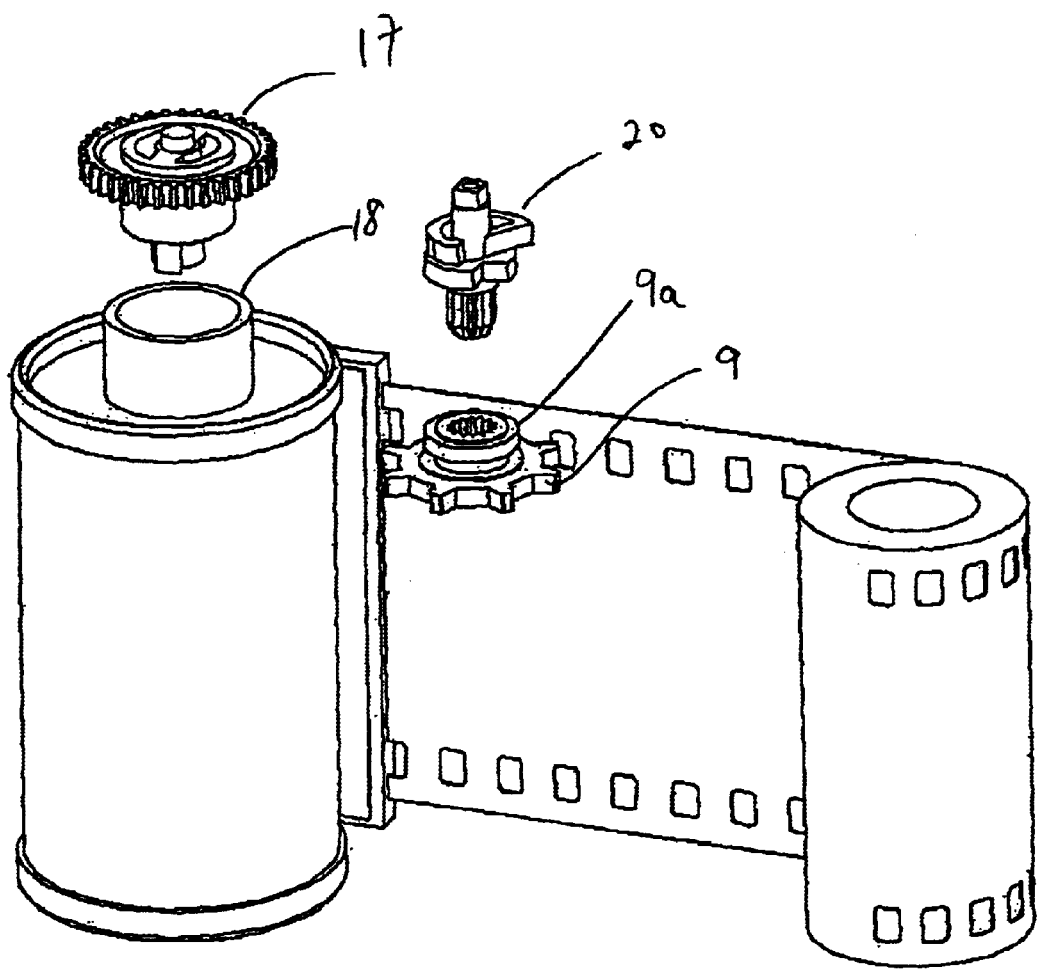
Figure 9F:
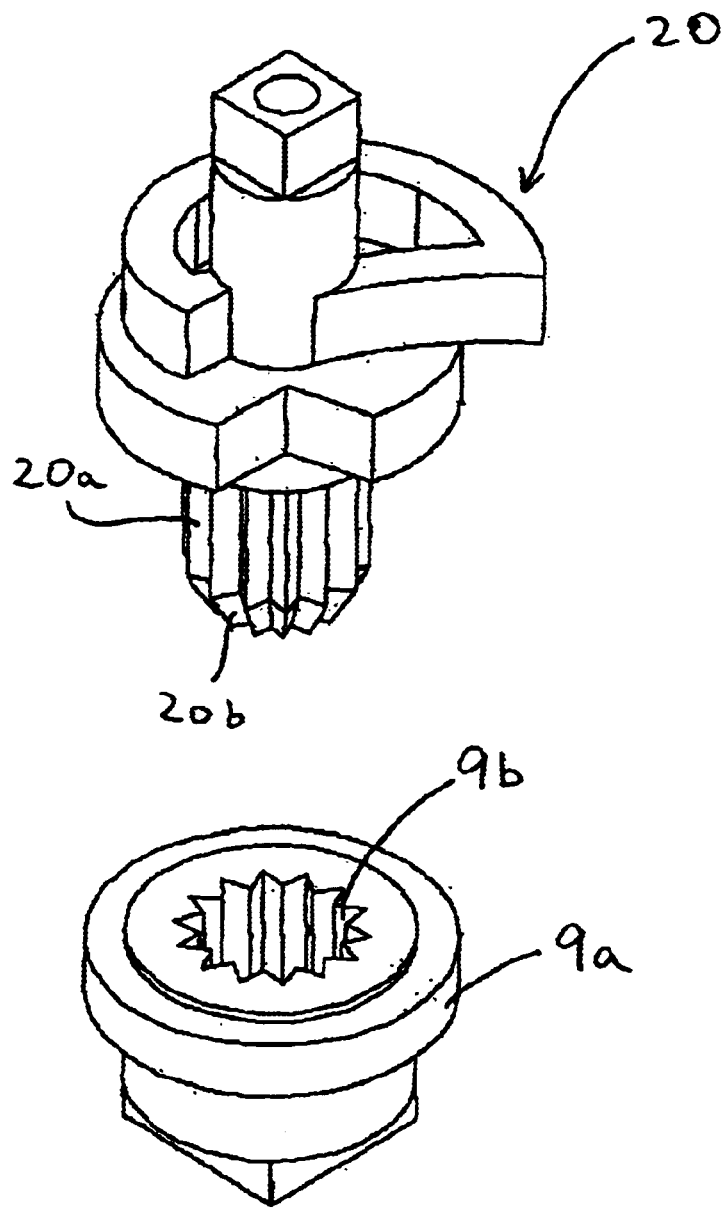

As illustrated in more detain in FIGS. 9c, 9(e) and 9(f), the interlock control 20 provided on the camera body 1 engages with the top sprocket 9 provided on the cartridge 2 for advancing the exposed film toward the collection spool 6. The interlock control 20 is provided with toothed shaft 20a which engages with the receiving means 9a of the sprocket 9. The receiving means 9a is a hollow shaft with a toothed inner surface 9b which engages with the toothed shaft 20a after the shaft 20a is accepted therein. To facilitate the insertion of the toothed shaft 20a into the hollow shaft 9a, the toothed shaft 20a is formed with a tapered head 20b, which helps to guide the toothed shaft 20a into the hollow shaft 9a during the insertion of the cartridge 2 into the camera body 1.

The rotation of the toothed wheel 17 and the interlock control 20 follows the triggering activation of the shutter of the camera with proper interlock mechanism which also prevents the double exposure of the film. The arrangement may work whereby the means to activate the camera shutter mechanism and thus take a photograph is only enabled when the film has been wound on. In a situation where the film has not been wound on from a previous photograph having been taken, then the camera shutter mechanism activation means will not be enabled.

Figure 10B:
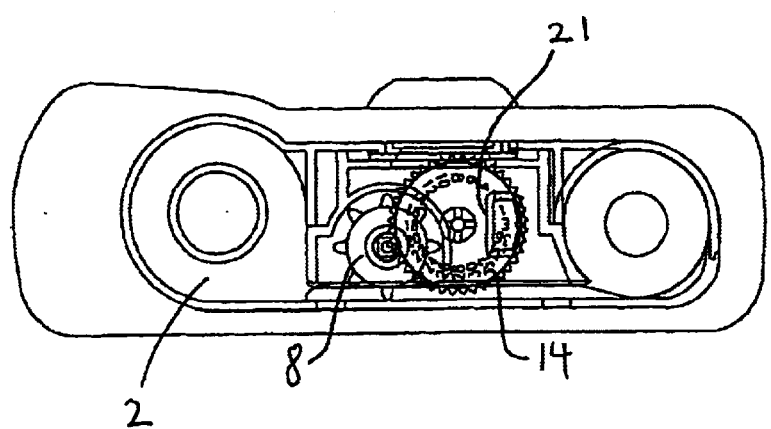
FIG. 10(b) shows a camera body and film cartridge assembled together viewed from the bottom showing the means with which the photographs remaining on the film are counted.
Figure 10A:
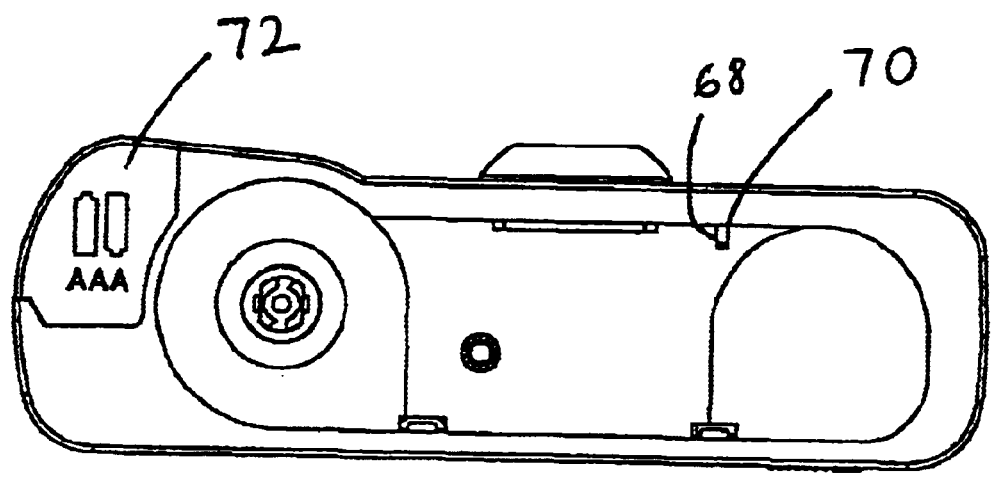
FIG. 10(a) shows a bottom view of a camera body and film cartridge illustrating how they are indexed into their relative positions.

The film counter 14 as shown in FIG. 10(b) is visible through an aperture 21 in the base of the film cartridge 2, as shown in FIG. 5. As most clearly shown in FIGS. 10(c) and 10(d), the counter 14 is in the form of a disc with numbers thereon to indicate the number of photos that have been taken, or to indicate the number of frames of the film that have not be used. Only even numbers are shown on the counter 14 in this embodiment in FIG. 10(c), and of course, odd numbers can also be used in addition to or in replacement of these even numbers.

The rotation of the counter 14 follows the rotation of the sprockets 9 and 8. More specifically, each time a photo is taken, the sprocket 9, which is interlocked with activation mechanism triggering the shutter (not shown), is activated to rotate an angle so as to advance a frame of film from the unexposed spooling region 12 to the exposed spooling region 7. The advancement of the film rotates the sprocket 8 which engages with the counter 14, thus transmitting the rotation to the counter 14. The direction of the rotation or movement of these related elements are shown by arrows in FIG. 10(d).

Figure 10C:
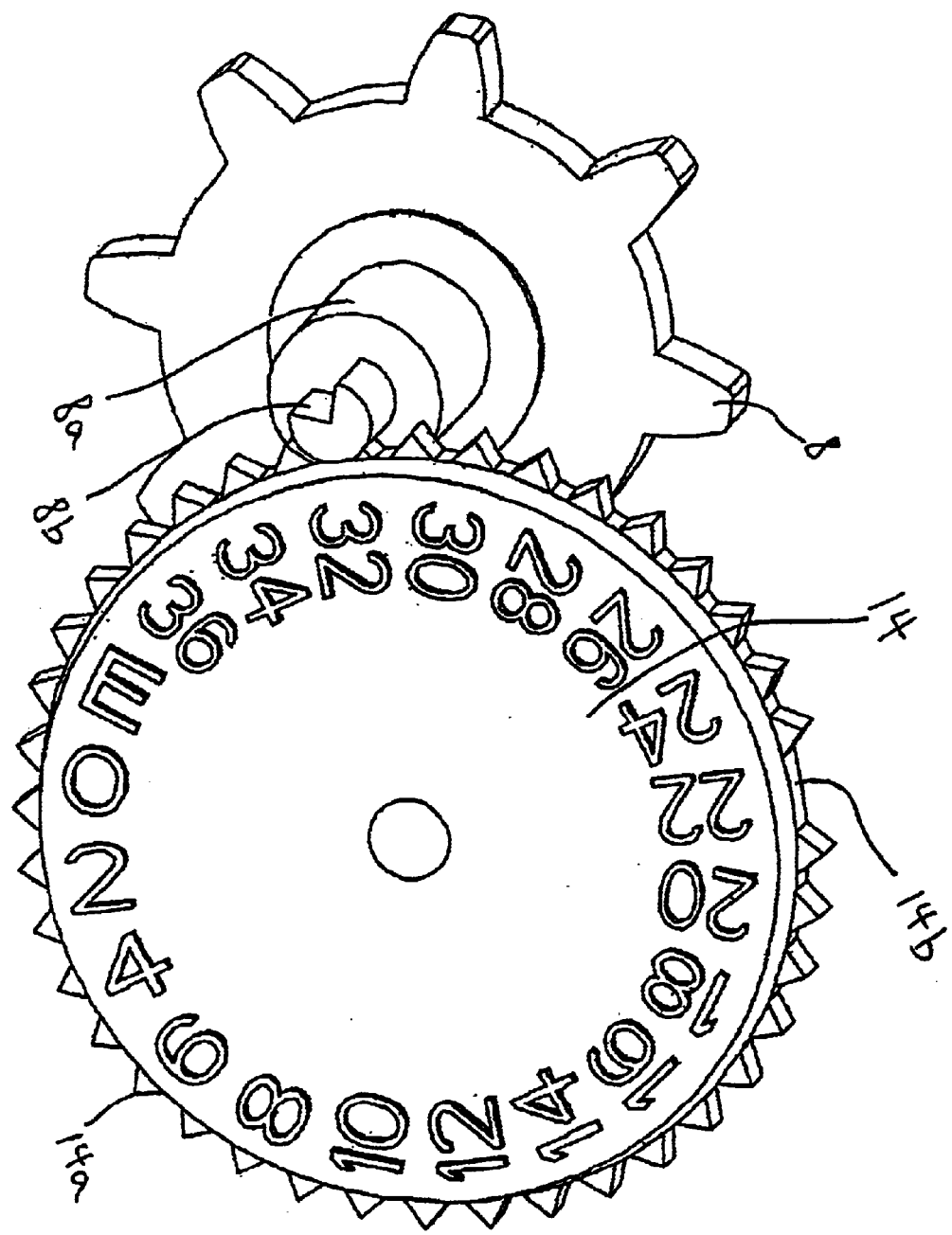
FIG. 10(c) shows the engagement between the counter and the bottom sprocket.
Figure 10D:
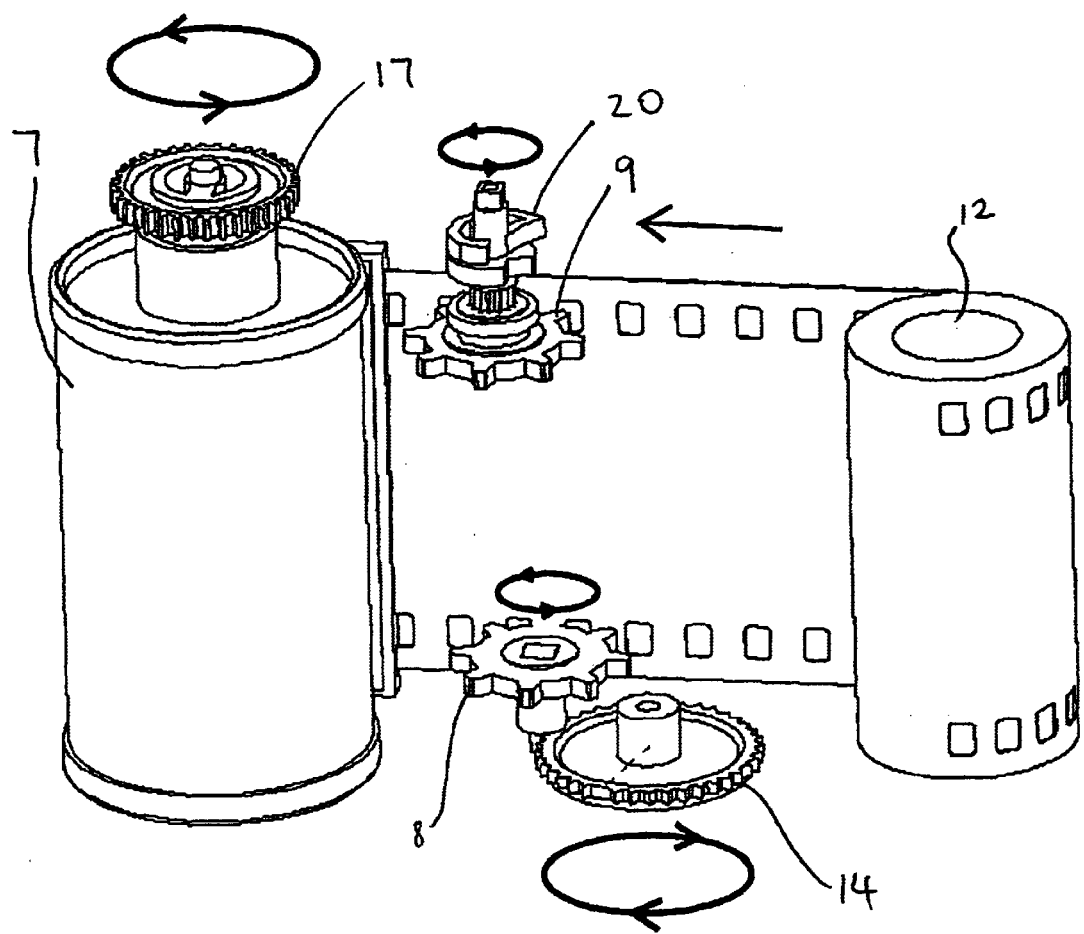
FIG. 10(d) shows the activation mechanism for the rotation of the counter shown in FIG. 10(c).

As shown in FIG. 10(c), the counter 14 is provided with teeth 14a around its peripheral, which engage with a notch 8b provided on a connection shaft 8a of the bottom sprocket 8. With the engagement between the teeth 14a and the notch 8b, the counter 14 may rotate incrementally corresponding to the advancement of each frame of the film. Because of the fact that the counter 14 is driven at its peripheral, the force applied thereon is not large, and therefore the harm to the film which drives the sprocket 8 is minimized.

It may be noted a slot 14b is provided at the peripheral of the counter 14 where there is no tooth. The position of the slot 14b corresponds to the number zero where the counter 14 will not further rotate once the slot 14b is reached. The slot 14b also helps to reset the counter 14 at the appropriate number when a new roll of film is installed.

As an alternative, the counter 14 may be concentrically connected to the shaft 8a of the sprocket 8. In such an arrangement, the peripheral teeth of the counter can be omitted, however a larger force is needed to drive the counter 14.

Figure 11A:
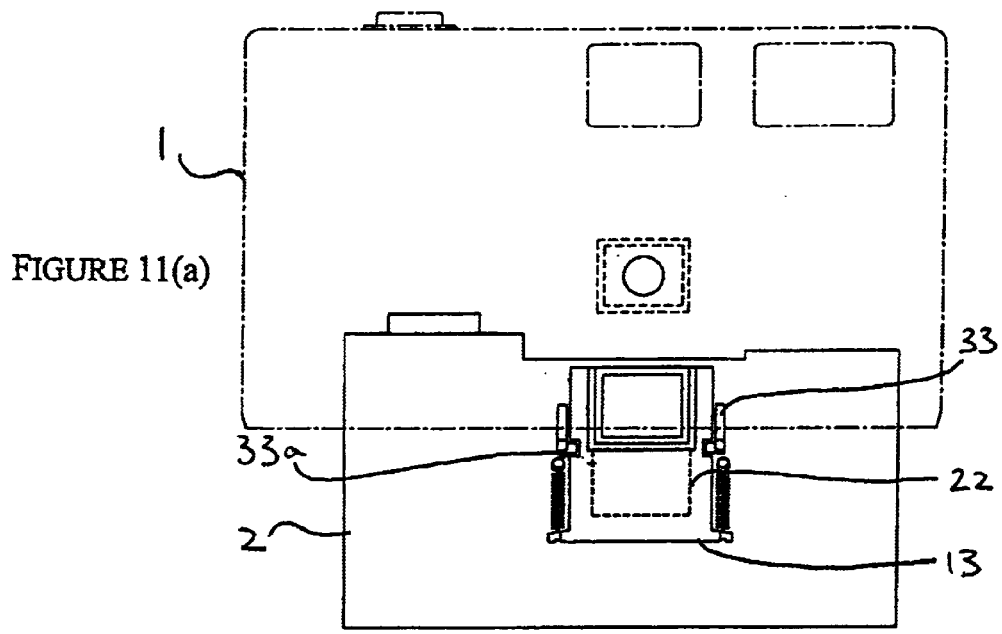
FIGS. 11(a) to 11(c) show the insertion of the film cartridge into the camera and in doing so the opening of the film cartridge door.
Figure 11B:
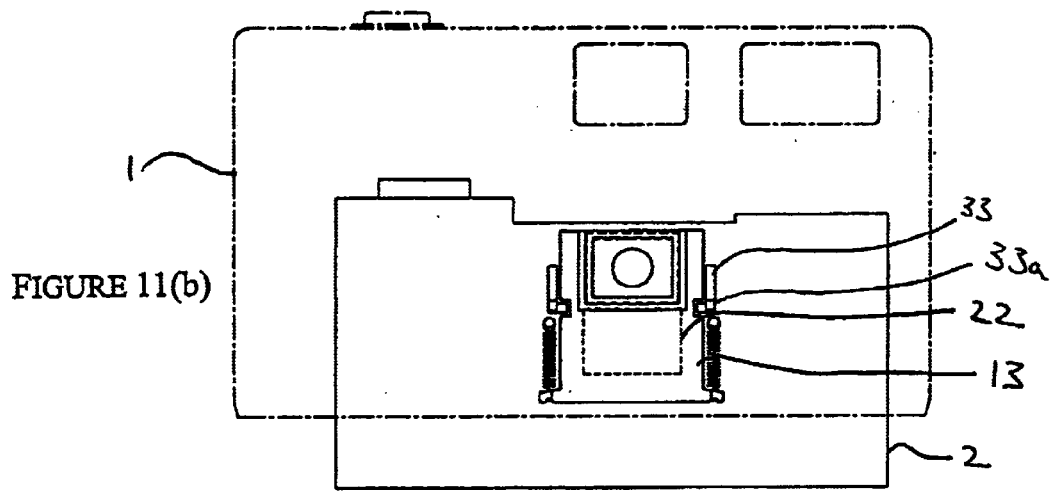

FIGS. 11(a)(b) and (c) show, as an exemplary embodiment, a series of movements of the film cartridge door 13 by translation to progressively open the film cartridge aperture 22. The film cartridge 2 is shown in FIG. 11(a) partially inserted into the camera body 1. With its locking tab ends 33a resting in notches 46 at both sides of the door 13, the L-shaped safety lock 33 engages the cartridge door 13 holding it closed. FIG. 11(b) shows the film cartridge 2 inserted into the camera body 1 just prior to engagement of the film cartridge door 13 with means (not shown) to open the film cartridge aperture 22. Final insertion of the film cartridge 2 into the camera body 1 releases the safety lock 33, either by swinging the locking tab ends 33a outward of the receiving notches 46 in the door 13 or perhaps by breaking off the locking tab ends 33a of the safety lock 33. The insertion moves the film cartridge door 13 completely to its open position and opens the film cartridge aperture 22 thus allowing a photograph to be taken upon pressing of the shutter activation button 23. The film cartridge door 13 is normally held closed when the film cartridge is out of the camera cartridge by springs 24 (a) and (b) which attach to the film cartridge at their upper point and to the film cartridge door 13 at their lower point.

Figures 8A, 8B:
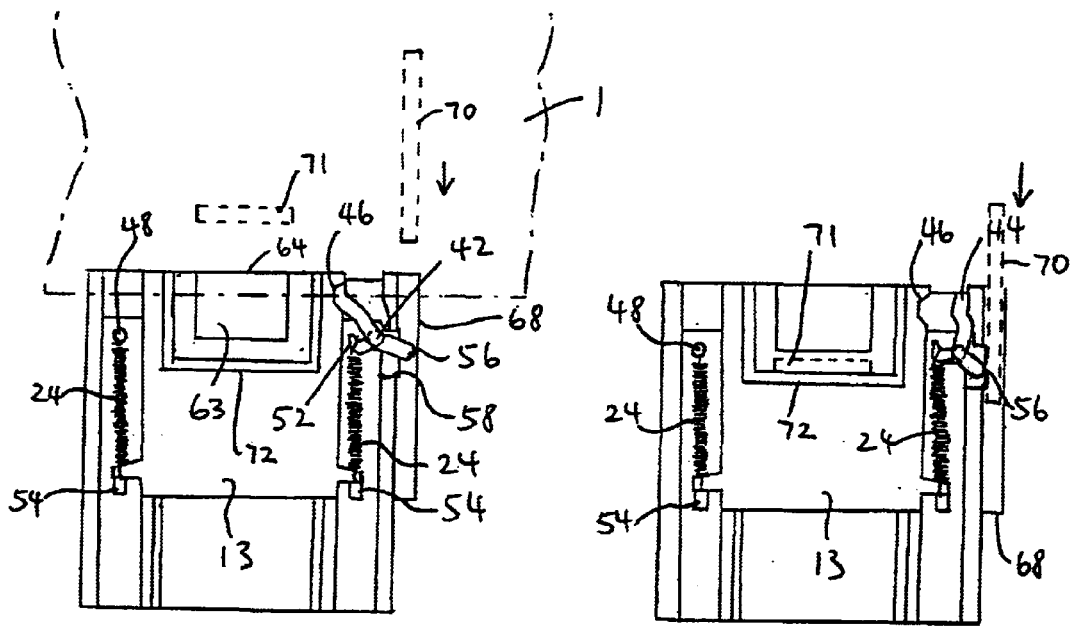
FIGS. 8(a), 8(b) and 8(c) respectively illustrate three stages in the operation of the film cartridge door.

FIG. 6(a) is an exploded view showing the various components of the cartridge, including the preferred embodiment of the safety lock 33. The safety lock 33, shown in FIGS. 8(d), 8(e) and 8(f) is an integral pivotal unit including a latch arm 44 engages with a notch 46 formed on a side wall of the door 13 so as to lock the door 13 at its closed position as shown in FIG. 8(a) when the cartridge 2 is not attached to the camera body 1. The safety lock 33 comprises a latch release lever 56 extending through an opening 58 formed on the body of the cartridge adjacent the door 13 into a guide groove 68 formed parallel to the linear movement path of the door 13. The safety lock 33 is capable of rotation around a pivot shaft 42, but is biased to its locking position as shown in FIG. 8(a), e.g., by a spring (not shown). When the cartridge 2 is outside of the camera body 1 as shown in FIG. 8(a), the latch arm 44 is normally pivoted as shown in FIG. 8(a) into the notch 46. This latching holds the door 13 over the film cartridge aperture 22 (not shown in FIG. 8(a)), blocking entrance of light into the film cartridge. The top edge 63 of the door 13 abuts an abutment 64 that positions the door 13. To match the U-shaped opening 13b of the door 13, the abutment 64 is a square protrusion in shape. A hook 48 supports the upper end 52 of the drive spring 24. The lower end of the spring 24 is attached on the spring tab 54 at the bottom of the door 13.

Upon insertion of the cartridge into the camera from below, a protrusion web 70 formed on the inner wall of the camera 1 moves into the guide groove 68 and pushes the latch release lever 56 out of the groove 68, whereby the latch arm 44 is moved out of the notch 46 upon rotation of the safety lock 33 around the pivot shaft 42 (FIG. 8(b)). Upon further insertion of the cartridge 2 into the camera body 1, the door 13 is opened by an activator or protrusion abutment 71 provided inside the camera body 1 which pushes on the edge 72 of the door 13 downward against the force of springs 24. During the insertion of the cartridge 2 into the camera body 1, the protrusion web 70 keeps its occupation in the groove 68 and prevents the latch release lever 56 from entering the groove 68, thus keeping the safety lock 33 at its unlocking position.

When detaching the cartridge 2 from the camera body 1, the protrusion abutment 71 and the protrusion web 70 moves away from the cartridge 2. Upon retreat of the protrusion abutment 71, the door 13 moves from its open position shown in FIG. 8(c) towards its closed position shown in FIGS. 8(b) and 8(a) because of the biasing force of the springs 24. Upon retreat of the protrusion web 70 from the groove 68, the latch release lever 56 reenters the groove 68 to its normal position because of the biasing force from a spring member (not shown), and the latch arm 44 reengages the notch 46 of the door 13 to prevent the door 13 from being accidentally opened.

Figure 8C:
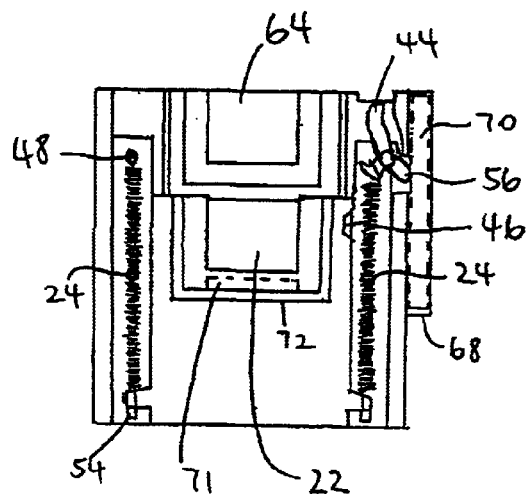
Figure 8D:
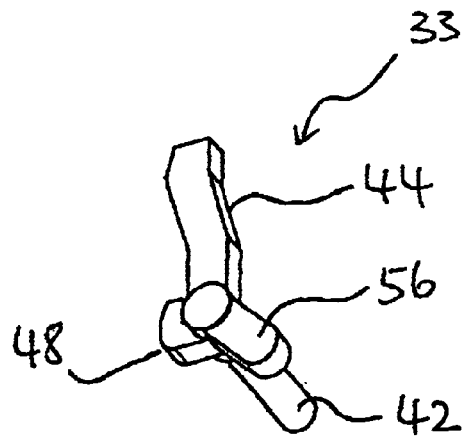
FIGS. 8(d), 8(e) and 8(f) are respectively perspective side and front views of a safety lock for the cartridge door.
Figure 8E:
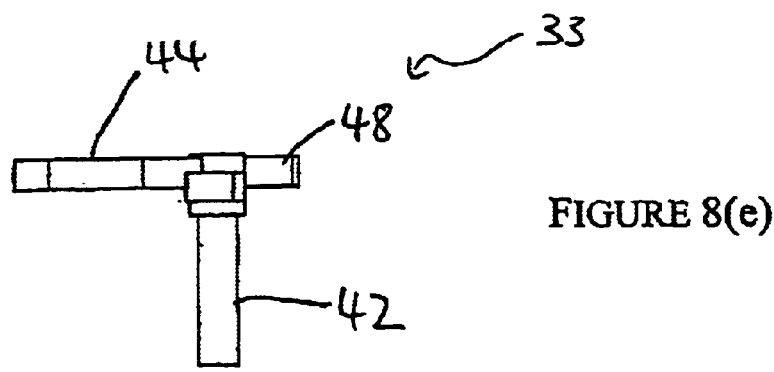
Figure 8F:
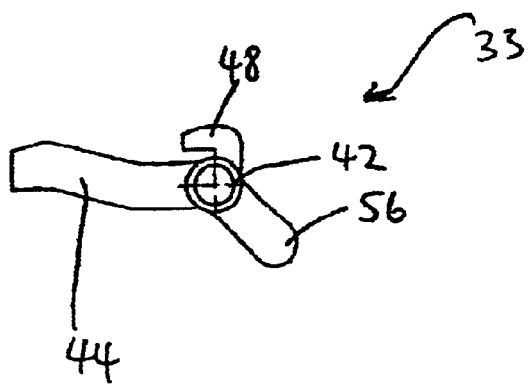
Figure 8G:
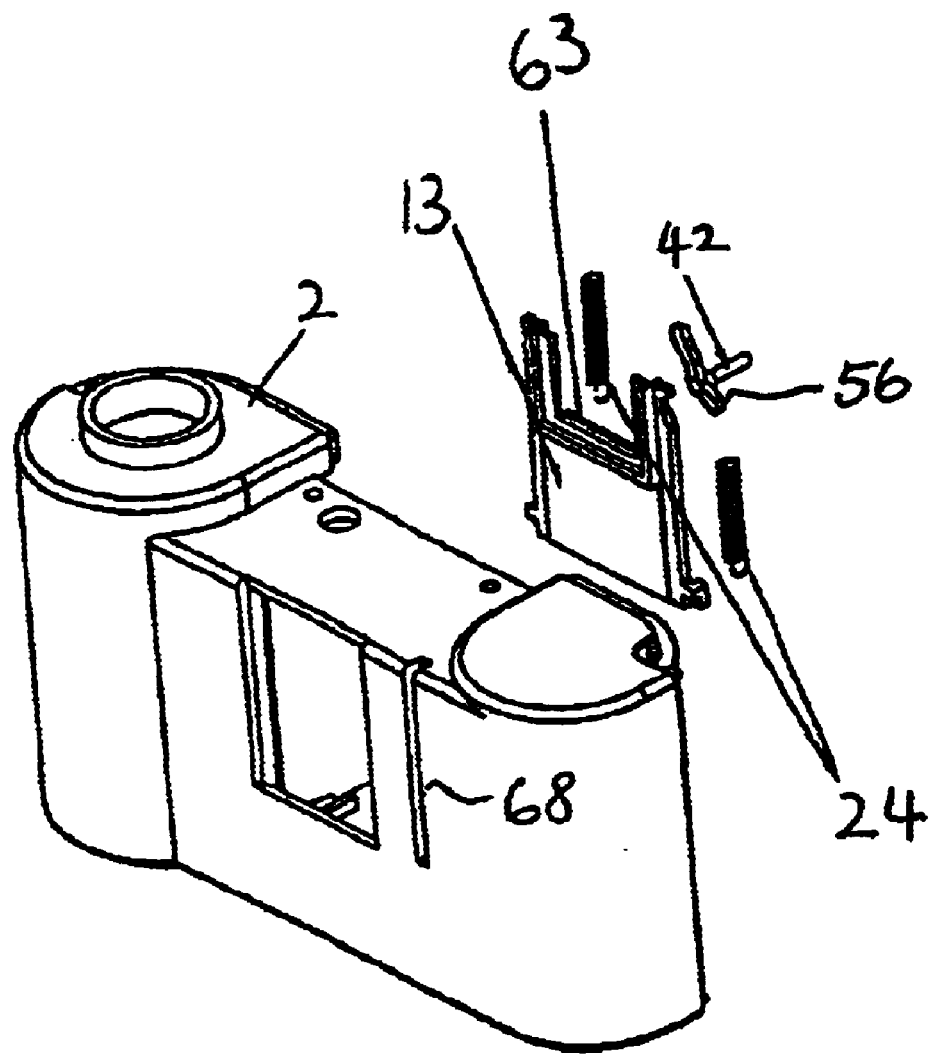
FIG. 8(g) shows the cartridge and the door separated from each other.

As an alternative, the springs 24 may be compression springs which by default pushes the door 13 towards its open position as shown in FIG. 8(c) if the safety lock 33 is released. In such a case, a device shall be provided to raise the door 13 against the bias of the compression spring 24 to its closed position before the cartridge 2 is removed from the camera body 1.

Figure 11C:
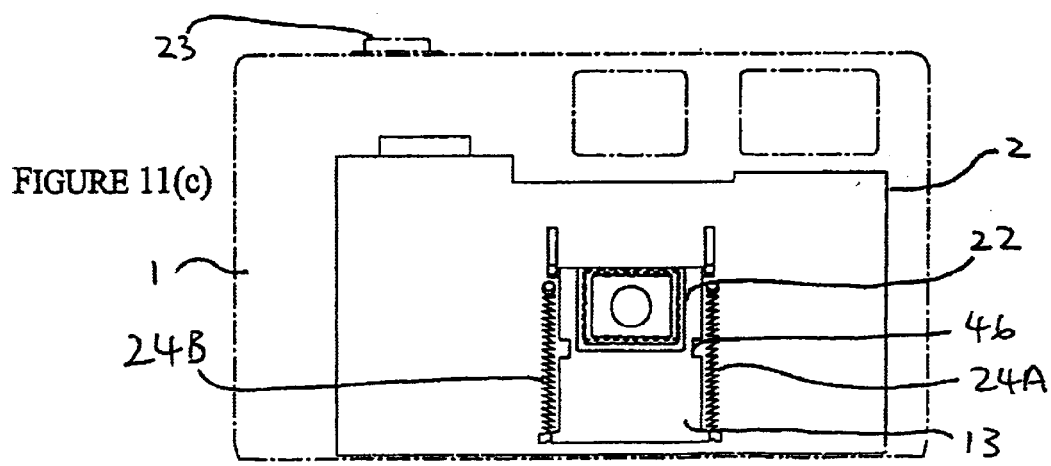
Figure 12A:
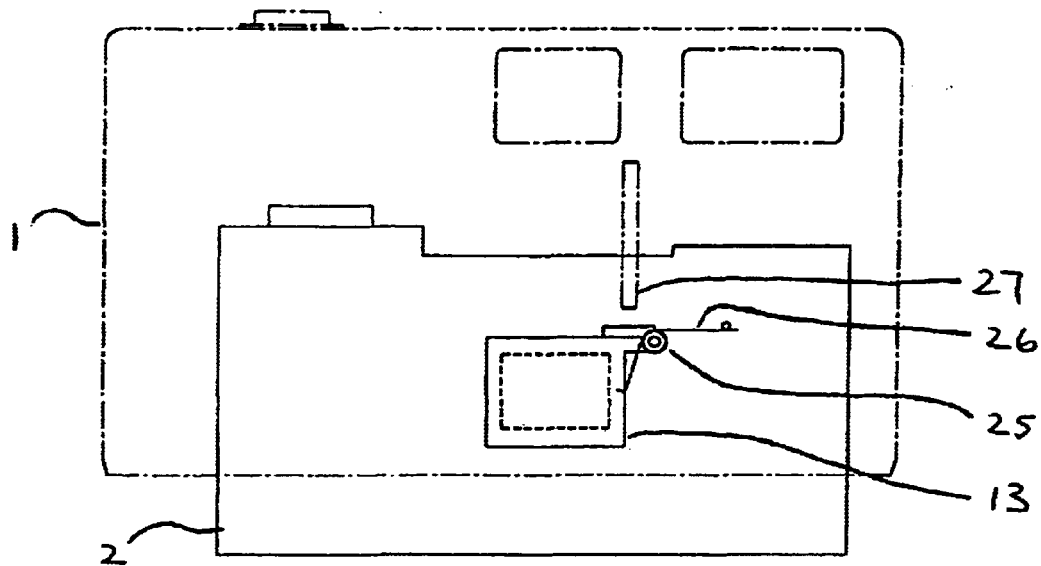
FIG. 12(a) and FIG. 12(b) show an alternative embodiment for the opening of the film cartridge door as the film cartridge is inserted into the camera body.
Figure 12B:
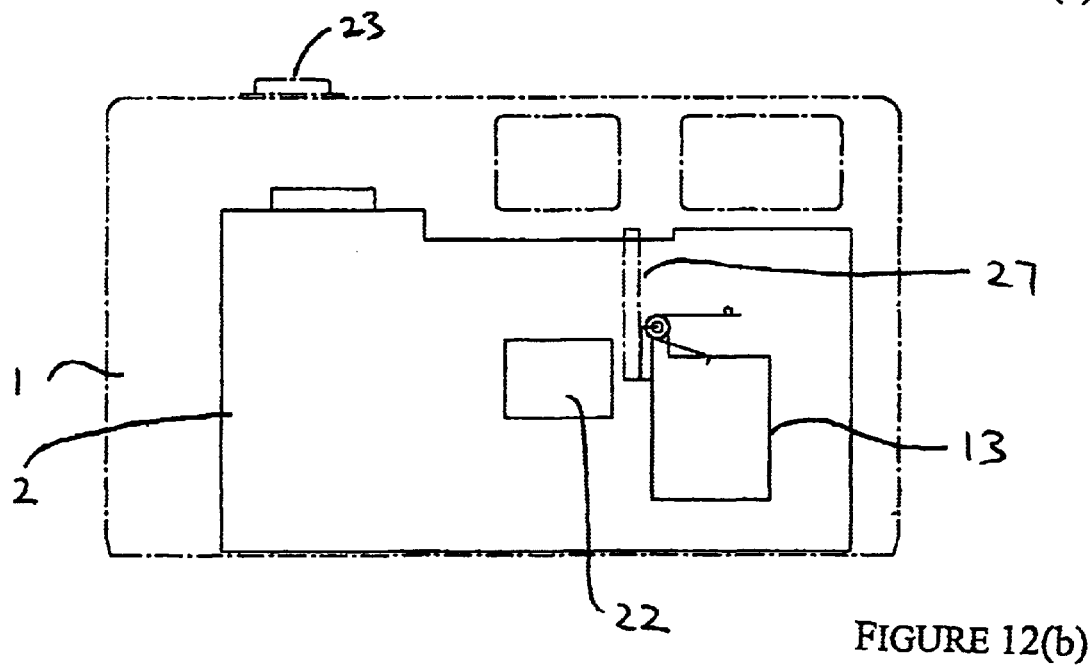

FIGS. 12(a) and (b) show an alternative means to that of FIG. 11 for opening the film cartridge door upon insertion of the film cartridge 2 into the camera body 1. FIG. 12(a) shows the film cartridge 2 partially inserted into the camera body 1. The film cartridge door 13 is rotatably supported by a pivot 25 and held in place by a spring means 26. A film cartridge door opening means 27 is located within the camera body. Upon final insertion of the film cartridge 2 into the body of the camera 1 as depicted in FIG. 12(b), the opening means 27 bears upon the film cartridge door 13 and rotates it, in this case, by for example 90 degrees, to open the film cartridge aperture 22. In this way correct operation of the camera shutter by the shutter activation button 23 will take a photograph of the viewed image.

Figure 13A:
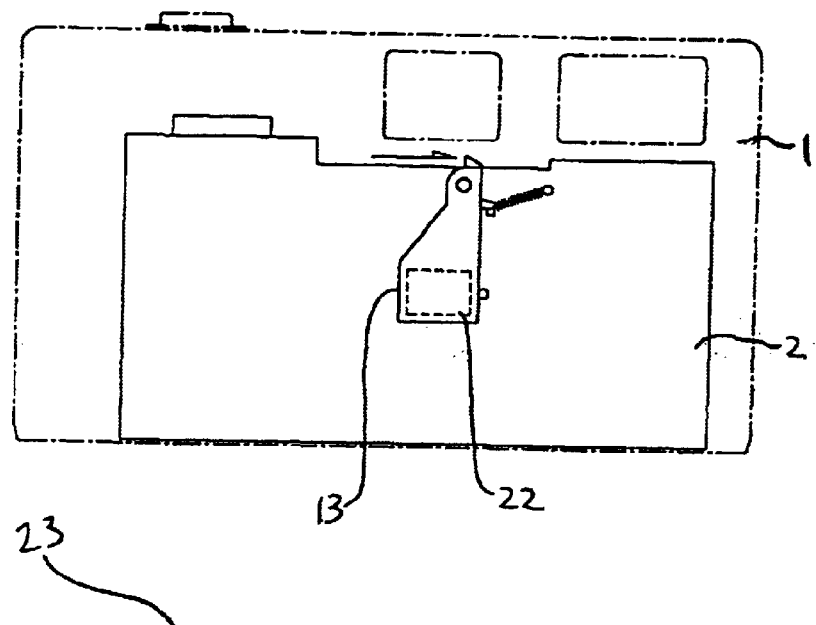
FIG. 13(a) and FIG. 13(b) illustrate a method where the camera shutter is actuated to thus exposing the film.
Figure 13B:
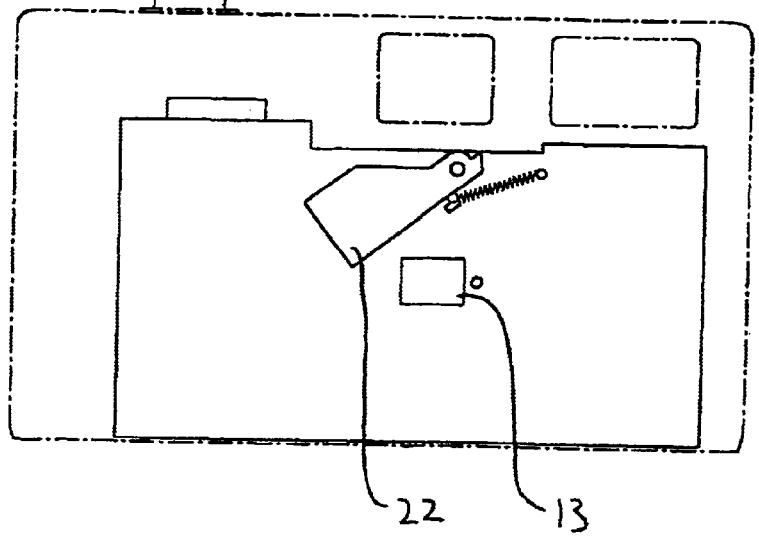

FIG. 13(a) shows a film cartridge 2 fully inserted into the camera 1 and a film cartridge door 13 covering the film cartridge aperture 22. FIG. 13(b) shows the aperture 22 uncovered by rotation of the film cartridge door 13 to the left. Here the film cartridge door 13 doubles as the camera shutter mechanism and also as the film cartridge door. The taking of a photograph by activation of the shutter button 23 activates the film cartridge door 13 (which is also the camera shutter) to rotate to one side and thus expose the film to the image.

Thus, with the cartridge door 13 also serving as the shutter of the camera, it is possible that no shutter is needed on the camera body 1 FIGS. 14(a) and (b) show an alternative means for film exposure. A cartridge door mechanism 30 in FIG. 14(a) is closed. Activation of the door is achieved by a button accessible from the exterior of the camera and the door folds into the dark room 10. Once the door is open the camera can be used at will to take photographs by the provision of the aperture, lens and shutter of the camera body.

Figure 16:
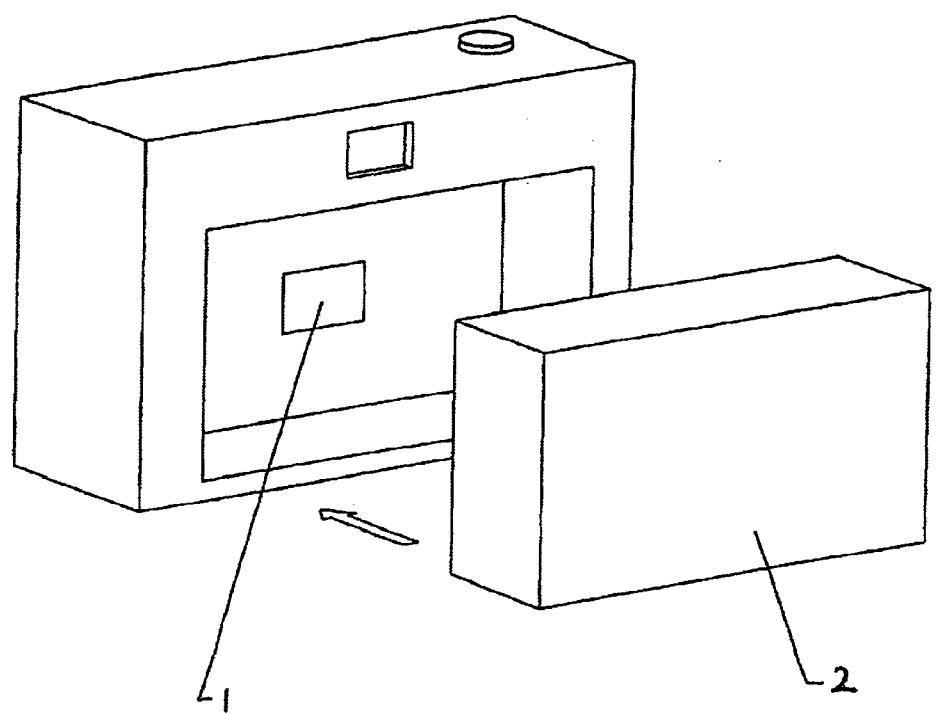
FIG. 16 shows an alternative film cartridge insertion embodiment whereby the film cartridge is inserted from the back of the camera body.
Figure 17:
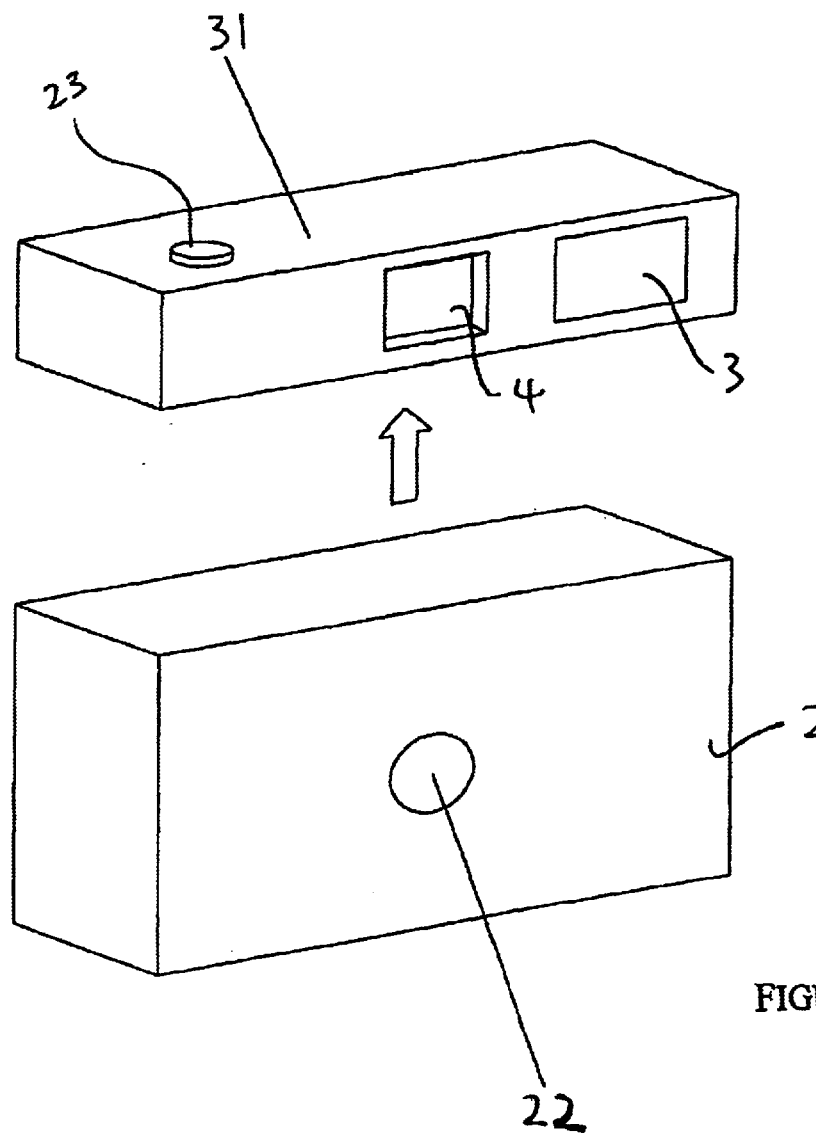
FIG. 17 shows a further alternative embodiment of the invention whereby the film cartridge comprises body of the camera including the camera shutter mechanism and a top section which comprises the control means and also the viewing and flash means.

One embodiment of the camera 1 and the film cartridge 2 is shown in FIG. 15, whereby the film cartridge 2 is brought into the camera from beneath and locked into position. FIG. 16 shows an alternative embodiment whereby the film cartridge 2 is inserted into the camera 1 from the rear face of the camera 1 and locked into position. FIG. 17 shows a further alternative embodiment whereby the film cartridge 2 contains not only the film and the exposure means but also the lens and is itself a component of the camera which the user will hold onto. This combination film-cartridge-camera body is then attached to control body 31 which includes the shutter activation button 23, the viewing means 4, and the flashlight means 3 which may be electrically powered by a battery in the cartridge. In this way the camera body is reduced to the bare minimum needed to activate, control and aim the camera and the film cartridge attaches to it and is the disposable or reattachable component.

Figure 18:
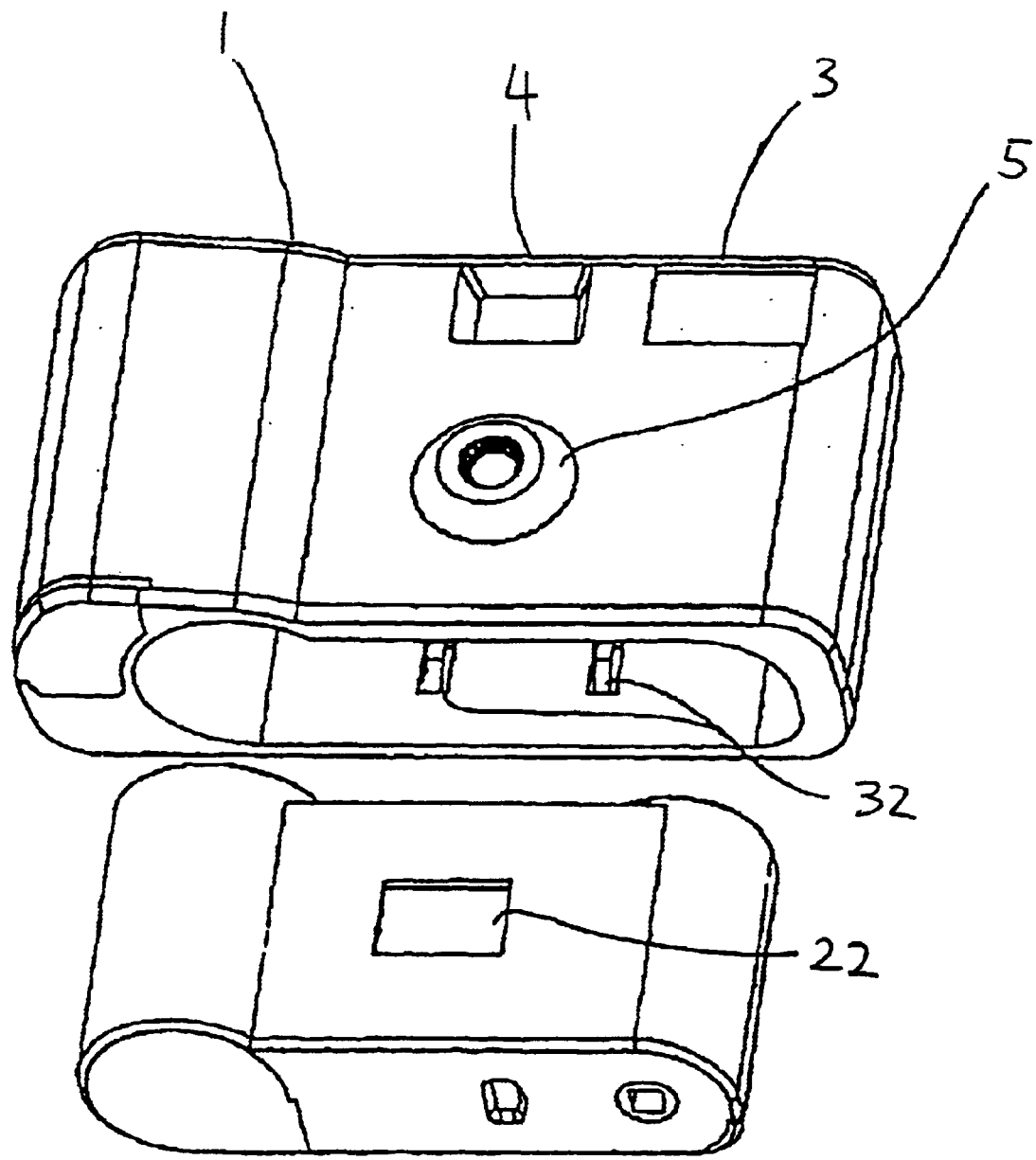
FIG. 18 show a different embodiment of the film cartridge of the present invention where no door is provided to light seal the dark room of the bridging portion.

It is also envisaged that the cartridge of the present invention, for example shown in FIGS. 3–6, may come in a form where there is no door provided and where the aperture 22 for the dark room 10 is not light sealable independent from being engaged with the camera body. This embodiment is for example shown in FIG. 18. The cartridge in this form may for example be substantially provided as shown in FIGS. 3–6 save for the provision of the door 13. The cartridge in a pre-used condition for example provides the film in a preloaded condition where the film is collected by a canister 6 provided at the second spool region and a substantial portion of the film is spooled in the unexposed film spooling region 12. That portion of the film extending between the two spooling regions and through the dark room will in such situations be exposed to light entering through the aperture 22. In such a pre-used condition the first frame of the film will be exposed. However, once the cartridge is inserted into the camera body, the subsequent winding on of the film onto the canister 6 will present the subsequent frames for appropriate exposure in capturing the image projected through the lens aperture and shutter of the camera body. The images that are then captured and wound onto the canister will then be retained in the canister in a light sealed environment. In order to ensure that the unexposed film in the unexposed film spooling region also remains unexposed at times where the cartridge is external of the camera body, this unexposed film spooling region is also light sealed. Such light sealing is preferably achieved by ensuring that the film extending from the unexposed film spooling region extends through a very narrow slot (as for example similar to the slot provided in the film canister) thereby preventing light from entering into the unexposed film spooling region. Such configuration is desirable whether or not the cartridge is provided with or without the door. Should the cartridge be removed from the camera midway during use, that frame presented in the dark room will become exposed to light. However, upon reinsertion of the cartridge into the camera body or another camera body, it merely requires the winding on of the film to advance the film to present an unexposed frame in the dark room for the subsequent exposure for capturing the next image. At the end of use of the cartridge, the film will have been wound on fully into the canister which can then be removed from the casing of the cartridge for processing by standard processing equipment.

Figure 19A:
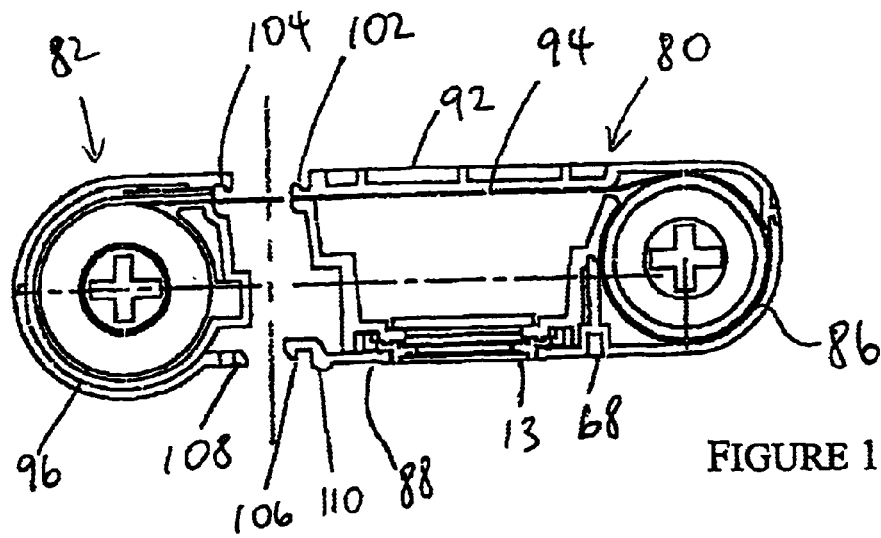
FIG. 19(a) is a cross sectioned view of an alternative cartridge design, viewed in the direction of arrows 19 in FIG. 19(b).
Figure 19B:
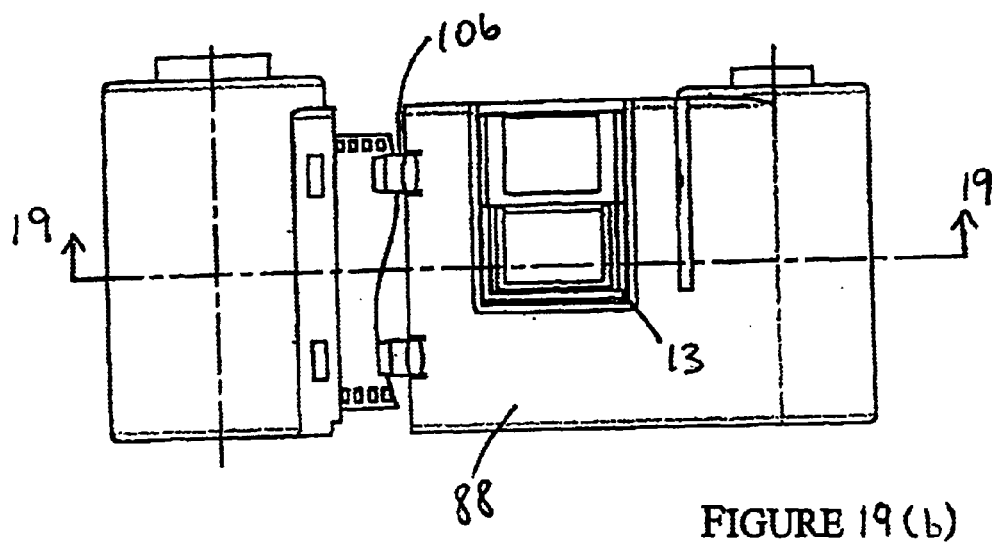
FIG. 19(b) is a front view of the alternative cartridge design.
Figure 19C:
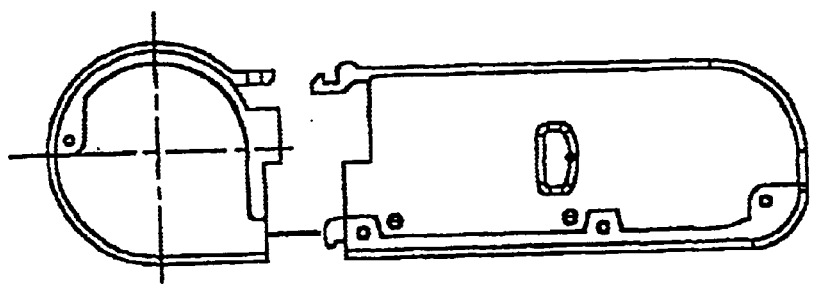
FIG. 19(c) is a bottom view of the alternate cartridge.
Figure 20B:
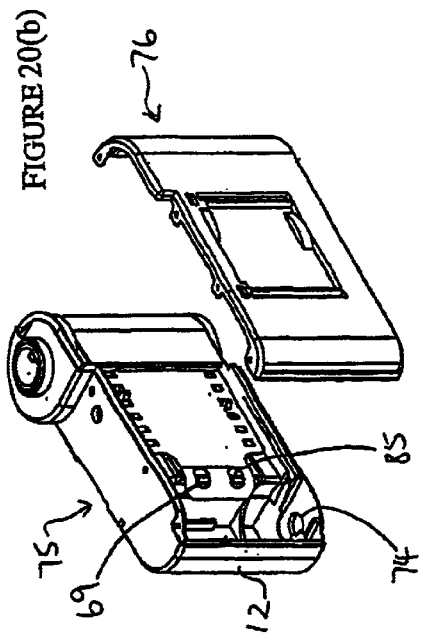
FIGS. 20(a)–(d) are perspective views of the cartridge of another embodiment.
Figure 20D:
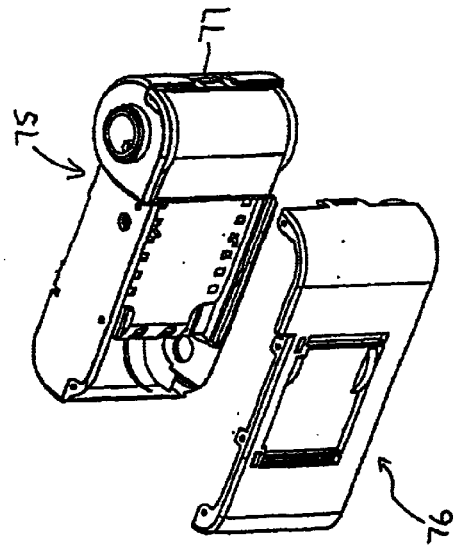
Figure 20A:
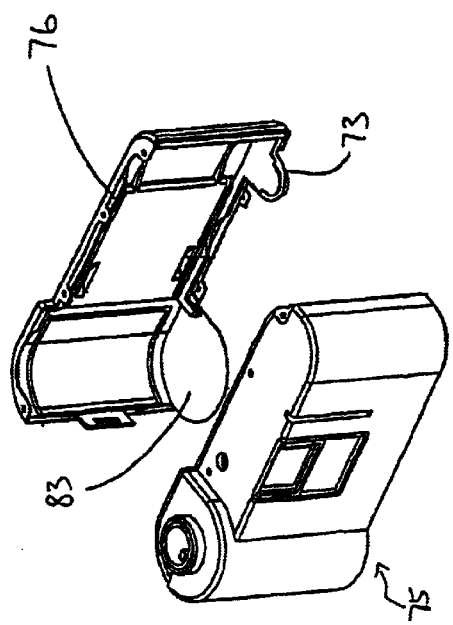
Figure 20C:
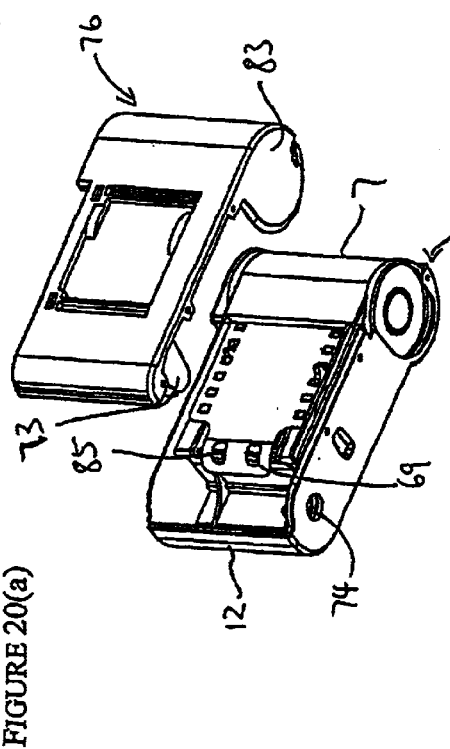

FIGS. 19a, 19b and 19c illustrate an alternative embodiment of a film cartridge 80 comprised of two main parts, the exposed film spooler region 82 where the exposed film is collected and the rest of the cartridge 84. The unexposed film is retained in a first spool region 86 of the rest of the cartridge 84. That portion 84 also includes the door 13 aperture 22 and the front 88 and rear plate 92 of the cartridge. The cartridge parts 82 and 84 are manufactured separately and after the film is loaded, they may be joined. The film 94 is drawn out of the region 86 toward the spool 96 which may be a film cannister or a wind-up reel.

After the initial portion of the film is wound on the spool 96, the cartridge parts 82 and 84 are adjoined. Illustrated are upper and lower sets of cooperating projections 102 on part 84 and cooperating locking groove 104 on part 82. To separably latch the cartridge parts, at the front of the cartridge there are two hooks 106 on part 84 which snap into receiving grooves or openings 108 on the cartridge part 82. With the projection 102 and the latch 104 and the latch 106 snapped into the groove 108, the cartridge is integrated. Upon completion of photography and whether it is desired to remove the wound film from the camera, the portions of the cartridge may again be separated for example by applying force to the release button 110 on the latch 106 for separating the latch 106 from the groove 108, and thereafter separating the projection 102 from the notch 104. A film cannister can be removed from the spooling region 96.

This cartridge also permits reloading, since new film may be loaded with a spooler in the portion 84. This arrangement has the benefit of enabling reloading of the cartridge with new film without having to thereafter form the cartridge around the installed film and more important, enables removal of film from the cartridge simply and without destroying the cartridge, which enables the cartridge to be reused.

This arrangement is also particularly useful for a loading technique where the supply of unexposed film is provided in a conventional film cannister, which can be put into the spooling region 96. Then the film to be used for the photography is led out of the spooling region 96 and wound into the spooling region 86, and before photograph begins. During photography, the film would be refed back to the cannister at region 96 so that by completion of photography, exposed film would be back in the cannister at region 96, which cannister had supplied the initial unexposed film.

The film cartridge can easily be ejected from the camera body when a switch is pushed releasing the film cartridge from the camera body. The camera body can in this way be used many times, and the film cartridge may also be recycled with new film loaded into it.

FIGS. 20a, 20b, 20c, 20d and 20e illustrates another embodiment of the cartridge 2 in which the cartridge 2 comprises a body part 75 and a cover part 76. The body part 75 substantially comprises both the unexposed spooling region 12 and the collection region 7. The body part 75 and the cover part 76 are connected together along their peripheral, e.g., by snapping the peripheral of the cover part 76 into the peripheral of the body part 75. A latch 77 is provided at the collection region 7 to secure the connection after assembling.

In the cover part 76, rims 78 are provided at the upper and bottom edges to bear against the film to locate it in position relative to the cartridge. Two slots 79 are provided to accommodate the sprockets after assembling so as to save room in the cartridge. The bottom of the cover part 76 are provided with two bulging portions corresponding to the two spool regions 7 and 12 in the body part 75 respectively. The smaller bulging portion 73 is used to cover a hole 74 in the bottom of the body part 75. Purpose of the hole 74 is for loading the film in the unexposed region 12, which will be explained in detail below. The larger bulging portion 73 covers the bottom of collection region 7 after the assembling of the cartridge.

A pair of stops 85 is provided at the inside of the unexposed region 12 of the body part 75, on which an end of the film is secured by a pair of holes, so to avoid further advancement of film when the whole roll of film has been completely exposed. With the stops 85, the motor of the camera will stop once the film is exhausted and the user can not press the shutter button any further.

An exploded perspective view of the cartridge 2 is shown in FIG. 20e, which is similar to FIG. 6(a). However, it shall be noted that there is no spool in the unexposed region 12 in this embodiment. The process for loading the film in to the cartridge shown in FIG. 20 is illustrated in FIG. 21.

Figure 21:
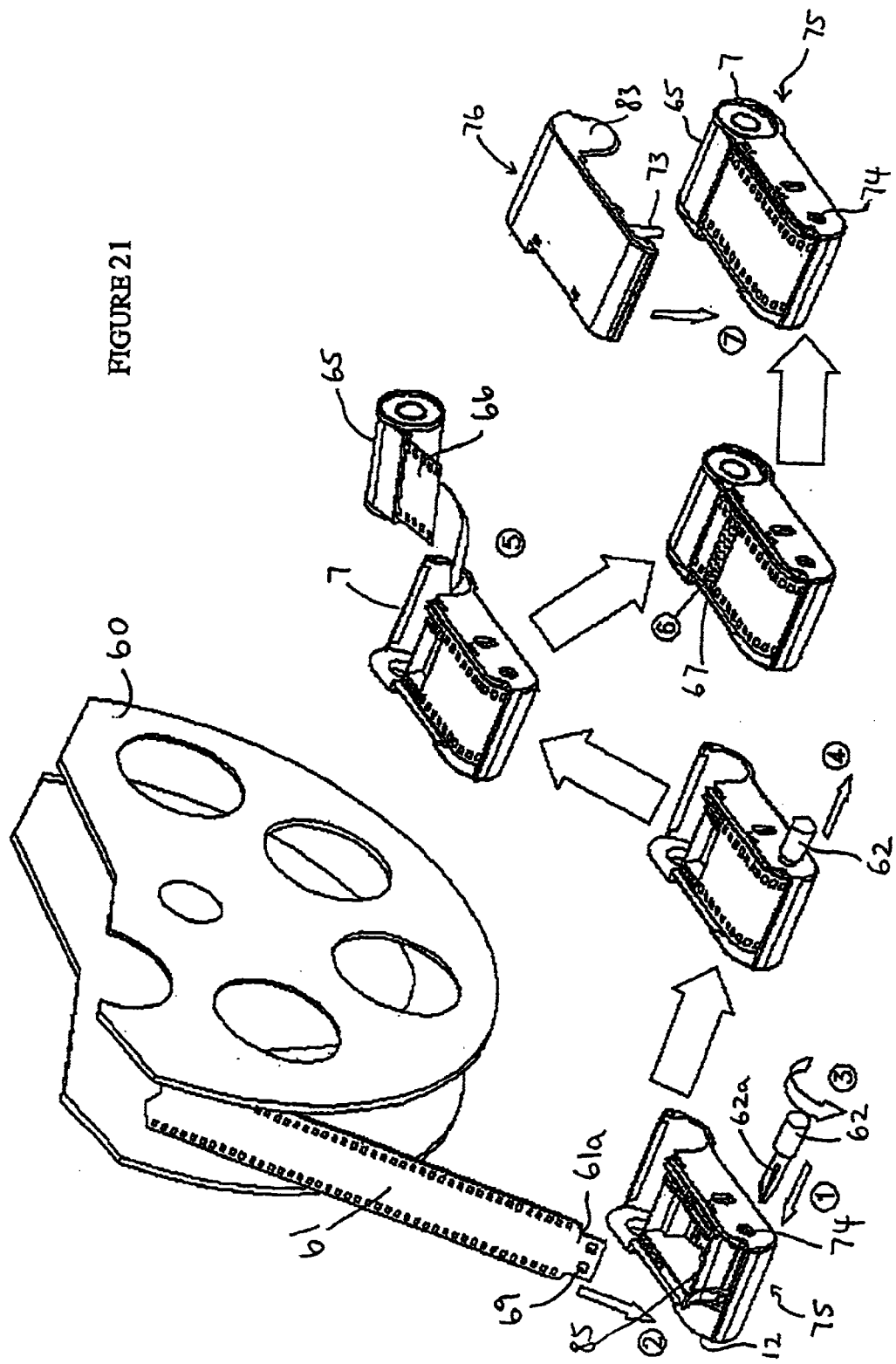
FIG. 21 illustrates the film loading process for loading the film to the cartridge shown in FIGS. 20(a)–(e).

As shown in FIG. 21, the film is loaded to the body part 75 of the cartridge 2 from a film spindle 60. The free end 61a of the film 61 is pulled out from the spindle 60 with the holes 69 at the free end 61a hooked to the stops 85 provided inside the unexposed spooling region 12. Then a spooling driver 62 is inserted into the unexposed region 12 from the hole 74 at the bottom of the body part 75. The driver 62 is provided with longitudinal slots 62a with an open end. The film 61 is inserted in the slots 62a and kept therein. Rotation of the driver 62 spools the film 61 and forms a film roll inside the unexposed region 12. After a predetermined length of film 61 is spooled, the film 61 is cut from the spindle 60 and the driver 62 is removed from the body part 75 of the cartridge. A collection container or canister 65 with a film stud 66 is placed into the collection region 7, and the cut end of the film 61 spooled in the unexposed region 12 is connected to the film stud 66, e.g., by an adhesive tape 67. Finally, the cover part 76 joins the body part 75 to form the cartridge 2, with the smaller bulging portion 73 covering the hole 74. The larger bulging region 83 covers the bottom the collection region 7. A light seal cartridge 2 with the film preloaded therein is thus ready for use.

When using the camera to take photos, the used film is collected in the collection container or canister 65 frame by frame upon exposure. After the film roll is completely used, the user may send the canister 65, which is preferably of a 135 standard, to any photo development store which will handle the canister just like a regular 135 film canister. No special machines or device is needed for the store to handle the film. No special experience or skill is required for the personnel in the store. Of course, the user may also send the cartridge with the canister 65 inside to the store, and let the store people to take the canister out. In any case, the canister 65 will be handled by a standard machine for developing regular film canisters, which is available in virtually all the photo development stores.

As an alternative, the film may be loaded from a standard film canister, e.g., an 135 film canister instead from the spindle 60. In such a case, the user may load the film by himself from a commercially available regular film canister. Preferably, the film is loaded after the cover part 75 is assembled with the body part 74, with proper film loading device (e.g., the spooling driver 62) to draw the film out from the canister 65 placed in the collection region 7 and spool the film in the unexposed region 12. Then, the canister 65 serves as a collection canister to collect the film frame by frame upon each exposure. Although the users may need to have some knowledge in loading the film, they can still benefit from the exchangeability of different cartridges.

A further alternative is that two canisters are preloaded in the cartridge 2. An unexposed film canister is placed in the unexposed spooling region 12 while a collection canister is placed in the collection region 7. When loading the film before use, a free end of the film is pulled out from the unexposed film canister and is connected, e.g., by an adhesive tape, to a stud extended from the collection canister.

Figure 22:
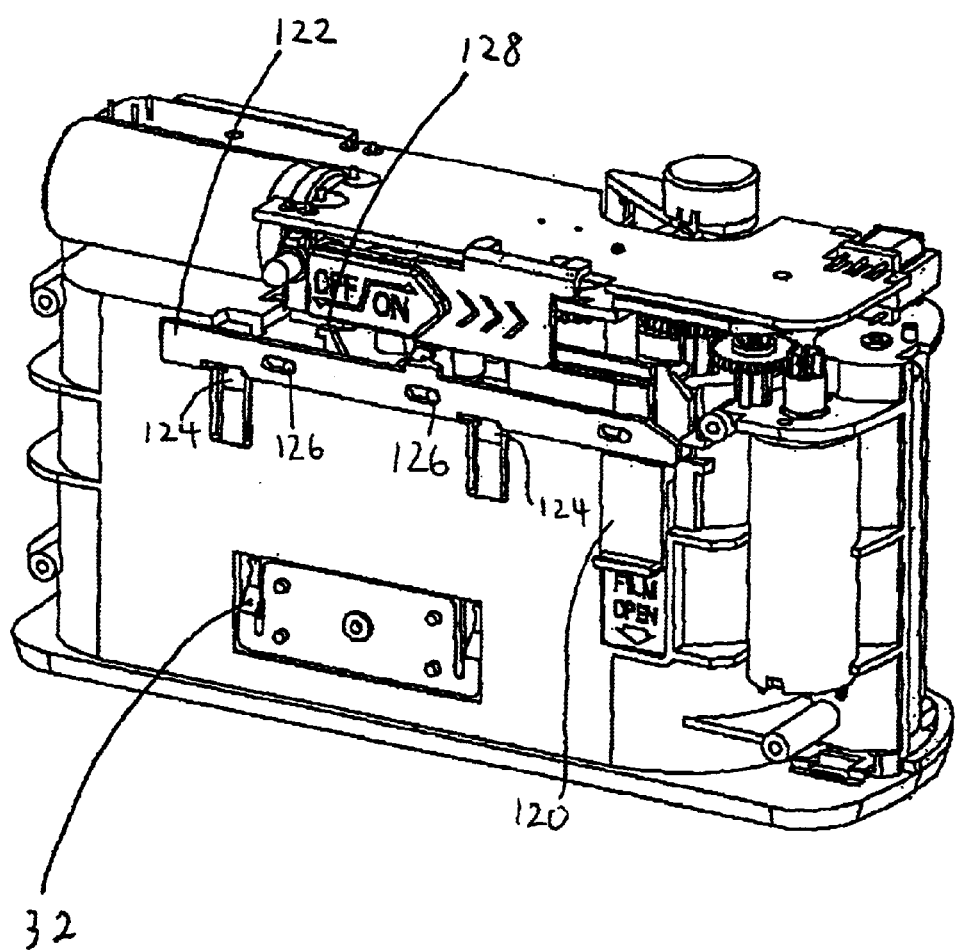
FIG. 22 is a rear perspective view of the camera with the backing plate removed.

FIG. 22 shows a rear perspective view of the camera body including the means that engages an installed film cartridge. There is a film open switch 120 which when operated permits removal of the film cartridge. That film open switch 120 is in turn connected with a release lever 122 which translates left and right and in the illustrated condition to the left frees the detent tabs 124 to press against the backing plate of the film cartridge and can be retained there. The film cartridge back side has recesses therein adapted to receive those tabs 124 which locks the film cartridge in position.

Movement of the switch 120 downward moves the lever 122 to the right on its support tabs 126 fixed on the back of the cartridge until the lever 122 raises the tabs 124 which releases the bias of the tabs 124 against the cartridge, freeing the cartridge to be released. A spring 128 attached to the lever and to the camera body urges the lever to the left and returns it to the left when the switch lever 120 is raised. The detent tabs 124 are then again in position to be received in the recesses 125 in the back of the film cartridge.

A pair of spring loaded arm or spring leaves 32 are provided inside the camera body 1, which engages with the grooves 34 (FIG. 6) provided on the back of the cartridge 2 for positioning purposes. Also the spring leaves 32 may prevent the cartridge 2 from accidentally dropping from the camera body 1 when the cartridge 2 is not fully accepted inside the camera body 2, in which case the detent tabs 124 may not have engaged with the recesses 125.

Figure 23:
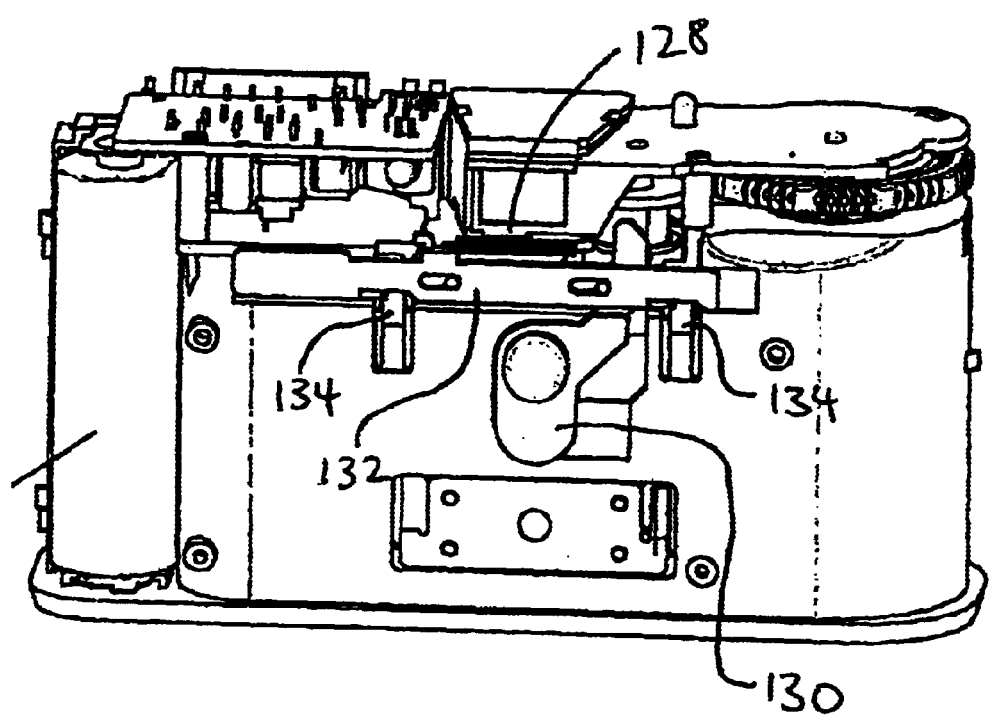
FIG. 23 is a rear view of an alternate for the arrangement for the camera body.

FIG. 23 is a rear view of an alternate view of the back of a camera with some elements exposed. It shows a different shape for the switch lever 132 to release the tabs 134 as in the previous embodiment.

Notably, in all preferred embodiments, the light tight 35 mm standard film cartridge is itself placed within an additional cartridge (e.g. 2). The additional cartridge 2 may itself be light tight in a selected condition (e.g. when the film door is closed), or may be light tight other than an exposure opening large enough for one frame. Thus, the outer cartridge may either be selectively light tight or light tight but for an opening sufficient for a single exposure frame.

The film may be loaded into the cartridge by pulling the film out of a container in a darkroom, and placing the roll of unexposed film and the now empty container into the cartridge 2, and then closing the cartridge. Alternatively, the cartridge may be loaded by pulling a rolled length of film from a bulk film dispensing device, commonly known in the art as a film "pancake" and then attaching the end of the film to a container. The container and the rolled film can then be placed into the cartridge. Finally, it is also possible to spin the film out of the container after the container is placed within the cartridge 2 by spinning a spool to which the free end of the film is connected, and then optionally removing the spool. The cartridge may be closed or open while such spinning occurs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A camera comprising:

a photographic film cartridge forming a dark room for accommodating a film, and a camera body having a receptacle for removably and snugly accepting said cartridge therein, wherein said cartridge is provided with an opening which remains closed when said cartridge is removed from said receptacle, and is openable for exposing said film to a light control device to form an image on said film when said cartridge is accepted in said receptacle, said cartridge being provided with a door selectively movable between a closed position to close said opening and an open position to open said opening, said cartridge being provided with a spring to force said door toward a closed position, and with an activator to force said door from said closed position to said open position against said spring upon a manual option after said cartridge is accepted into said camera body, said manual operation being an actuation on a shutter of said camera for taking a frame of photo.

2. The camera of claim 1 wherein said shutter is formed by said door.

3. The camera of claim 1 wherein said shutter is provided on said camera body and a button is provided for said actuation of said shutter.

4. The camera of claim 3 wherein an interlock mechanism is provided between said activator for moving said door and said button for actuating said shutter.

5. A camera comprising:

a photographic film cartridge forming a dark room for accommodating a film, and a camera body having a receptacle for removably and snugly accepting said cartridge therein, wherein said cartridge is provided with an opening which remains closed when said cartridge is removed from said receptacle, and is openable for exposing said film to a lens to form an image on said film when said cartridge is accepted in said receptacle, said lens being provided on said cartridge and covering said opening, and a shutter being provided on said camera body.

6. A film cartridge detachably attachable to a camera body having a light control device, comprising:

a light sealed housing forming a dark room for accommodating a film, wherein said housing is provided with an opening which remains closed with a door when said cartridge is detached from said camera body and is openable for exposing said film to said light control device when said cartridge is attached to said camera body, said cartridge further comprising a locking element remaining in a locking position for keeping said door closed when said cartridge is detached from said camera body, and an unlocking mechanism for removing said locking element from said locking position upon attachment of said cartridge to said camera body, said cartridge also comprising and activation member for opening said door upon attachment of said cartridge to said camera body, and upon activation of said shutter mechanism for taking a photo.

7. The film cartridge of claim 6 wherein said shutter is formed by said door.

8. The film cartridge of claim 6 further comprising an interlock element to implement said activation of said door by a button for activating said shutter.

9. A camera body, comprising:
a light control device for communicating an image on a film,
a receptacle for removably and snugly accepting a film cartridge therein, said film cartridge having a housing forming a dark room for accommodating said film therein but with an opening which remains closed by a door when said cartridge is outside said receptacle;
said camera body comprises an activation mechanism for opening said door to expose a frame of said film to said light control device through said opening when said cartridge is accepted in said receptacle, said door being opened when said cartridge is inserted into said receptacle and when a shutter is activated.

10. The camera body of claim 9 wherein said shutter is formed by said door.

11. The camera body of claim 9 further comprises a button for activating said shutter.

12. The camera body of claim 11 further comprising an mechanism for interlocking between said door and button such that said door is opened upon pushing said button to activate said shutter.

13. A film cartridge for use with a camera comprising a light tight film container within an outer cartridge, said outer cartridge being either selectively light tight or being light tight but for an opening sufficient only to expose a single frame, and film within said film cartridge, said cartridge comprising a door arranged to close and lock when said film cartridge is removed from said camera, said door being biased to a closed position, said cartridge further comprising a counter and a sprocket means operable in cooperation with each other to change a count each time a picture is taken.

14. A method of loading film comprising withdrawing the film from a light tight container, placing said withdrawn film and said container from which it was withdrawn within a cartridge, and placing said cartridge within a camera.

15. The method of claim 14 wherein said cartridge is light tight.

16. The method of claim 15 further comprising changing said cartridge from light tight to a state in which it is light tight but for an opening to expose a single frame.

17. The method of claim 15 wherein said step of changing occurs automatically upon insertion of said cartridge into a camera.

18. A camera comprising:
a photographic film cartridge forming a dark room for accommodating a film, and a camera body having a receptacle for removably and snugly accepting said cartridge therein,
wherein said cartridge further comprises a film canister inside said dark room for collecting exposed films, said film canister being removable from said cartridge, said cartridge comprising an unexposed spooling region for accommodating an unused portion of the film and a collection spooling region for accommodating an exposed portion of the film, wherein said film canister rests in said collection region, said camera body having an opening at its bottom that is wider at one side than at the other such that the wider side accommodates a portion of the cartridge containing said film canister.

19. A method of loading film in a cartridge, comprising: making a film roll in an unexposed spooling region of said cartridge, connecting a free end of said film roll to a film stud extended from a collection canister placed in a collection spooling region of said cartridge, and closing said cartridge to form a light sealed dark room.

20. The method of claim 19 wherein said free end of said film roll is connected to said film stud of said collection canister by an adhesive tape.

21. The method of claim 19 wherein said film roll is made from a film spindle.

22. The method of claim 19 wherein said film roll is made by means of a spooling driver which is removable from said unexposed spooling region after making said roll, wherein said film cartridge has a front and a back, at least one of which has first and second covering portions, one of which covers a the chamber with exposed film, and another of which covers a chamber with unexposed film.

23. A photographic film cartridge forming a dark room for accommodating a film, comprising:
a sprocket driven by an advancement of said film upon exposure, and a counter for indicating an amount of said film that has been taken or remains unexposed, wherein said counter is driven by said sprocket.

24. The cartridge of claim 23 wherein said counter is a toothed disc with teeth provided along its peripheral surface for engaging with a notch provided on a rotation shaft of said sprocket.

25. The cartridge of claim 24 wherein said peripheral surface of said counter has a slot portion without said teeth, said slot does not engage with said notch of said rotation shaft whereby indicating that said film is completely exposed.

26. The cartridge of claim 23 wherein said counter is concentrically mounted on a rotation shaft of said sprocket.

* * * * *